United States Patent
Nashiki et al.

(10) Patent No.: US 9,116,380 B2
(45) Date of Patent: Aug. 25, 2015

(54) DISPLAY PANEL DEVICE HAVING TOUCH INPUT FUNCTION

(75) Inventors: Tomotake Nashiki, Ibaraki (JP); Kazuhiro Nakajima, Ibaraki (JP); Hideo Sugawara, Ibaraki (JP); Tsuyoshi Chiba, Ibaraki (JP); Hiroaki Kishioka, Ibaraki (JP); Mayumi Kishioka, legal representative, Toyohashi (JP); Tomohide Banba, Ibaraki (JP); Masahiro Ooura, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 52 days.

(21) Appl. No.: 13/990,397

(22) PCT Filed: Nov. 29, 2011

(86) PCT No.: PCT/JP2011/077553
§ 371 (c)(1),
(2), (4) Date: May 29, 2013

(87) PCT Pub. No.: WO2012/073964
PCT Pub. Date: Jun. 7, 2012

(65) Prior Publication Data
US 2014/0036170 A1   Feb. 6, 2014

(30) Foreign Application Priority Data

Nov. 30, 2010   (JP) ................................. 2010-267379

(51) Int. Cl.
*G02F 1/1333*   (2006.01)
*G06F 3/044*   (2006.01)
(Continued)

(52) U.S. Cl.
CPC .............. *G02F 1/13338* (2013.01); *G06F 3/03* (2013.01); *G06F 3/044* (2013.01); *G06F 3/045* (2013.01)

(58) Field of Classification Search
CPC ..... G02F 1/13338; G06F 3/044; G06F 3/045; G06F 3/03
USPC .............................................. 349/12; 345/174
See application file for complete search history.

(56) References Cited

U.S. PATENT DOCUMENTS 8,848,114 B2 *   9/2014   Wang et al. ..................... 349/12
2008/0138589 A1   6/2008   Wakabayashi et al.
(Continued)

FOREIGN PATENT DOCUMENTS

| CN | 1286424 A | 3/2001 |
| CN | 1516816 A | 7/2004 |

(Continued)

OTHER PUBLICATIONS

International Search Report mailed Dec. 27, 2011 for PCT/JP2011/077553.

(Continued)

*Primary Examiner* — James Dudek
(74) *Attorney, Agent, or Firm* — Lowe Hauptman & Ham, LLP

(57) ABSTRACT

A display panel device has a window, a touch panel laminate and a display panel. The touch panel laminate has: a transparent first substrate layer; a first transparent conductive layer laminated to the first substrate layer through a first undercoat layer; a transparent second substrate layer; and a second transparent conductive layer laminated to the second substrate layer through a second undercoat layer. The second conductive layer faces the first conductive layer through at least the first substrate layer and the first undercoat layer. The first conductive layer is closer to the window than the first substrate layer. A polarizing film layer is bonded to the window, and a λ/4 retardation film layer is disposed between the polarizing film layer and the touch panel laminate. The display panel is disposed on a side opposite to the window with respect to the touch panel laminate.

9 Claims, 19 Drawing Sheets

(51) Int. Cl.
  *G06F 3/045* (2006.01)
  *G06F 3/03* (2006.01)

(56) References Cited

U.S. PATENT DOCUMENTS

| | | | |
|---|---|---|---|
| 2008/0176042 | A1 | 7/2008 | Nashiki et al. |
| 2009/0160819 | A1 | 6/2009 | Sasaki et al. |
| 2009/0322704 | A1 | 12/2009 | Anno |
| 2010/0015417 | A1 | 1/2010 | Nakajima et al. |
| 2011/0135892 | A1 | 6/2011 | Nashiki et al. |
| 2011/0141059 | A1 | 6/2011 | Nashiki et al. |
| 2011/0143105 | A1 | 6/2011 | Nashiki et al. |
| 2011/0147340 | A1 | 6/2011 | Nashiki et al. |
| 2012/0274605 | A1 | 11/2012 | Anno |

FOREIGN PATENT DOCUMENTS

| | | |
|---|---|---|
| CN | 101057210 A | 10/2007 |
| JP | 03009323 | 1/1991 |
| JP | 3542838 | 6/1996 |
| JP | 2002040243 | 2/2002 |
| JP | 2002055780 | 2/2002 |
| JP | 2002156920 | 5/2002 |
| JP | 3569557 | 9/2004 |
| JP | 2008098169 | 4/2008 |
| JP | 2009076432 | 4/2009 |
| JP | 2010009439 | 1/2010 |
| JP | 2010027294 | 2/2010 |
| JP | 2010198103 | 9/2010 |
| KR | 10-2007-0054661 A | 5/2007 |
| WO | 2006028131 | 3/2006 |
| WO | 2006126604 | 11/2006 |

OTHER PUBLICATIONS

Korean Office Action for application No. 10-2013-7016611 dated Jul. 1, 2014.

Chinese Office Action for Application No. 201180057572.8 dated mailed May 6, 2015.

\* cited by examiner

1

DISPLAY PANEL DEVICE HAVING TOUCH INPUT FUNCTION

CROSS REFERENCE TO RELATED APPLICATION

This application claims the priority of Japanese Patent Application No. 2010-267379, filed on Nov. 30, 2010 in the JIPO (Japanese Intellectual Property Office). Further, this application is the National Phase application of International Application No. PCT/JP2011/077553 filed on Nov. 29, 2011, which designates the United States and was published in Japanese.

TECHNICAL FIELD

The present invention relates to a display panel device having a touch input function. In particular, the present invention relates to a display panel device having a capacitive touch input function.

BACKGROUND ART

A display panel device equipped with a touch panel for touch input is disclosed in a large number of documents. For example, JP 2002-040243A (Patent Document 1), JP 2002-055780A (Patent Document 2) and JP 2002-156920A (Patent Document 3) disclose a display panel device in which a touch panel for touch input is disposed on an upper side of a display panel board. All of the touch panels described in the Patent Documents 1 to 3 are a resistive type in which two transparent electrodes are disposed in a spaced-apart and opposed relation, wherein one of the transparent electrodes disposed on a viewing side of the display panel device is adapted to be pressed and brought into contact with the other transparent electrode, thereby allowing a tough input to be sensed. In the Patent Documents 1 to 3, there is an air gap between the two electrodes, which leads to a problem that reflected light in surfaces of the electrodes is transmitted to the viewing side of the display panel device, causing deterioration in display quality. In order to cope with this problem of internal reflection, the Patent Documents 1 to 3 teach arranging a circular polarization element on the viewing side with respect to the touch panel. Specifically, the Patent Documents 1 to 3 propose to arrange a linear polarization layer and a ¼λ retardation (phase difference) layer in this order from the viewing side of the display panel, and arrange the touch panel on a lower side of the ¼λ retardation layer. The Patent Document 1 discloses a configuration in which a touch panel is combined with a reflective liquid crystal display, and the Patent Document 2 mentions applicability to both a liquid crystal display and an organic EL display. Further, the Patent Document 3 offers an example of an organic EL display.

JP 2010-198103A (Patent Document 4) discloses a capacitive touch input device. A touch sensor described in the Patent Document 4 comprises two patterned electrically conductive layers each provided on a respective one of opposite sides of a substrate film formed as a single body. A touch sensor having a similar laminate configuration is described in FIG. 5 of JP 2009-076432A (Patent Document 5). The Patent Document 5 further describes, in FIG. 7 thereof, a double-electrode type touch sensor prepared by: forming a transparent electrode layer on one surface of a film substrate through an undercoat layer; bonding the other surface of the film substrate to a second film substrate through an adhesive layer; and forming a second transparent electrode layer on the second film substrate through a second undercoat layer. Details of patterning of a transparent electrode for use in a touch sensor are described in WO 2006/126604A.

JP 03-009323A (Patent Document 7) teaches selecting an appropriate material under recognition of a necessity to achieve optical isotropy without the occurrence of colored interference fringes, when a resin material is used in an electrode substrate for a liquid crystal display panel. JP 3542838B (Patent Document 8) and JP 3569557B (Patent Document 9) describe using an optically isotropic resin material as a material for an electrically conductive transparent sheet for a touch panel. In the Patent Documents 7 and 8, a recommended optically isotropic resin material includes a polycarbonate-based resin, a polyethersulfone-based resin, a polysulfone-based resin, and a polyarylate-based resin.

LIST OF PRIOR ART DOCUMENTS

Patent Documents

Patent Document 1: JP 2002-040243A
Patent Document 2: JP 2002-055780A
Patent Document 3: JP 2002-156920A
Patent Document 4: JP 2010-198103A
Patent Document 5: JP 2009-076432A
Patent Document 6: WO 2006/126604A
Patent Document 7: JP 03-009323A
Patent Document 8: JP 3542838B
Patent Document 9: JP 3569557B

SUMMARY OF THE INVENTION

Technical Problem

Although not described in any of the above Patent Documents, in a conventional display device, an edge print having a given width is provided on a back surface of a display window along an edge thereof. Then, a member located in underlying relation to the window is bonded to the window along a back side of the edge print through an adhesive layer. In the conventional display device having the above configuration, an air gap is formed between the window and the underlying member, and internal reflection occurs due to the air gap. Thus, even if a circular polarization element is disposed at a position close to the viewing side, as described in the Patent Documents 1 to 3, internally reflected light will be transmitted through the window, causing deterioration in display quality.

In the configuration disclosed in the Patent Document 4, one of the electrically conductive layers of the touch panel sensor is located at a position close to a protective cover as a window, so that internal reflection in this electrically conductive layer appears at a display section, causing deterioration in display quality. In the Patent Document 5, there is not any teaching or suggestion about how to cope with the problem of internal reflection.

In a display panel device having a capacitive touch input function, the present invention addresses a technical problem of maximally preventing deterioration in display quality due to internal reflection of light.

The Patent Document 7, the Patent Document 8 and the Patent Document 9 describe using an optically isotropic material as a material for an electrode supporting substrate usable in a display panel device. However, they do not disclose what layer configuration is desirable in terms of overall properties of the display panel device when the electrode supporting substrate is made of an optically isotropic material.

Therefore, the present invention addresses another technical problem of providing a display panel configuration capable of, when an electrode supporting substrate made of an optically isotropic material is used in a configuration for capacitive touch input, generally reducing a thickness of a display panel device than before, while simplifying a layer configuration.

Solution to the Technical Problem

In order to solve the above technical problem, according to a first aspect of the present invention, there is provided a display panel device which has a capacitive touch input function, wherein it comprises a window, a touch panel laminate and a display panel. In the display panel device, the touch panel laminate comprises: an optically transparent first substrate layer; a first transparent electrically conductive layer laminated to one surface of the first substrate layer through a first undercoat layer; an optically transparent second substrate layer; and a second transparent electrically conductive layer laminated to one surface of the second substrate layer through a second undercoat layer. The second transparent electrically conductive layer is disposed to face the first transparent electrically conductive layer through at least the first substrate layer and the first undercoat layer, and each of the first and second transparent electrically conductive layers is patterned in a given pattern. Further, the first transparent electrically conductive layer is disposed on a side closer to the window with respect to the first substrate layer. A polarizing film layer is bonded to the window through an adhesive layer, and a $\lambda/4$ retardation film layer is disposed between the polarizing film layer and the touch panel laminate. The display panel is disposed on a side opposite to the window with respect to the touch panel laminate.

When the display panel is composed of a liquid crystal display panel, a second $\lambda/4$ retardation film layer and a second polarizing film layer are arranged between the liquid crystal display panel and the touch panel laminate in this order when viewed from the side of the touch panel laminate, and a third polarizing film layer is disposed on a side opposite to the touch panel laminate with respect to the liquid crystal display panel.

In the above liquid crystal display panel device, even in a layer configuration where the first transparent electrically conductive layer is disposed close to the window, a combination of the first polarizing film layer and the first $\lambda/4$ retardation film layer each disposed close to the window makes it possible to significantly reduce an undesirable situation where that a pattern of the first transparent electrically conductive layer becomes visible due to light internally reflected by the first transparent electrically conductive layer and the first substrate layer and returned through the window, i.e., a pattern visibility problem. In addition, the window-side polarizing film layer is bonded to the window through the adhesive layer, which makes it possible to eliminate an air gap on a back side of the window, thereby reducing the internal reflection. The second $\lambda/4$ retardation film layer disposed between the liquid crystal display panel and the touch panel laminate is required to match a polarization state with respect to a circular polarization element composed of the first polarizing film layer and the first $\lambda/4$ retardation film layer each disposed close to the window. The second and third polarizing film layers disposed, respectively, on opposite sides of the liquid crystal panel is required for display by the liquid display panel.

In order to reduce the pattern visibility problem, at least the first undercoat layer in the first and second undercoat layers may be composed of an at least two-layer structured undercoat layer. In this case, the at least two-layer structured undercoat layer is preferably configured such that a near-side undercoat layer therein on a side closer to the first transparent electrically conductive layer has a refractive index less than that of a far-side undercoat layer therein on a side farther from the first transparent electrically conductive layer, and a thickness less than that of the far-side undercoat layer, wherein the near-side undercoat layer is patterned in the same pattern as that of the first transparent electrically conductive layer.

In the display panel device according to the first aspect of the present invention, each of the first and second substrate layers may be made of an optically isotropic material. In this case, the second transparent electrically conductive layer may be disposed on the side of the first substrate layer with respect to the second substrate layer, and an optically transparent adhesive layer may be disposed between the second transparent electrically conductive layer and the first substrate layer.

According to a second aspect of the present invention, there is provided a liquid crystal display panel device which has a capacitive touch input function, wherein it comprises a window, a touch panel laminate and a liquid crystal display panel. In the liquid crystal display panel device, the touch panel laminate comprises: an optically transparent and optically isotropic first substrate layer; a first transparent electrically conductive layer laminated to one surface of the first substrate layer through a first undercoat layer; an optically transparent and optically isotropic second substrate layer; and a second transparent electrically conductive layer laminated to one surface of the second substrate layer through a second undercoat layer, wherein the second transparent electrically conductive layer is disposed to face the first transparent electrically conductive layer through at least the first substrate layer and the first undercoat layer, and each of the first and second transparent electrically conductive layers is patterned in a given pattern, and wherein: the first transparent electrically conductive layer is disposed on a side closer to the window with respect to the first substrate layer; a first polarizing film layer is bonded to the window through an optically transparent adhesive layer; the touch panel laminate is bonded to the first polarizing film layer through an optically transparent adhesive layer; the liquid crystal display panel is disposed on a side opposite to the window with respect to the touch panel laminate; and a second polarizing film layer is disposed on a side opposite to the touch panel laminate with respect to the liquid crystal display panel. In the liquid crystal display panel according to the second aspect of the present invention, it is possible to reduce the number of layers as compared to the liquid crystal display panel according to the first aspect of the present invention.

In this liquid crystal display panel device, the second transparent electrically conductive layer may be disposed on the side of the first substrate layer with respect to the second substrate layer, and an optically transparent adhesive layer may be disposed between the second transparent electrically conductive layer and the first substrate layer. In this case, a dielectric constant between the first and second transparent electrically conductive layers can be adjusted to a desired value by adjusting a material and a thickness of the adhesive layer to be disposed between the second transparent electrically conductive layer and the first substrate layer. In the second aspect of the present invention, each of the undercoats may be composed of the at least two-layer structured layer, and each of the first and second substrate layers may be formed as an optically isotropic material layer.

According to a third aspect of the present invention, there is provided a liquid crystal display panel device which has a capacitive touch input function, wherein it comprises a window, a touch panel laminate and a liquid crystal display panel. In the liquid crystal display panel device, the touch panel laminate comprises: an optically transparent and optically isotropic first substrate layer; a first transparent electrically conductive layer laminated to one surface of the first substrate layer through a first undercoat layer; an optically transparent and optically isotropic second substrate layer; and a second transparent electrically conductive layer laminated to one surface of the second substrate layer through a second undercoat layer, wherein the second transparent electrically conductive layer is disposed to face the first transparent electrically conductive layer through at least the first substrate layer and the first undercoat layer, and each of the first and second transparent electrically conductive layers is patterned in a given pattern, and wherein: the first transparent electrically conductive layer is disposed on a side closer to the window with respect to the first substrate layer; a first polarizing film layer is bonded to the window through an optically transparent adhesive layer; the touch panel laminate is bonded to the first polarizing film layer through an optically transparent adhesive layer; the second transparent electrically conductive layer is disposed on a side opposite to the first substrate layer with respect to the second substrate layer; an optically transparent adhesive layer is disposed between the first substrate layer and the second substrate layer; the liquid crystal display panel is disposed on a side opposite to the window with respect to the touch panel laminate, and bonded to the touch panel laminate through an optically transparent adhesive layer; and a second polarizing film layer is disposed on a side opposite to the touch panel laminate with respect to the liquid crystal display panel.

According to a fourth aspect of the present invention, there is provided an organic EL display panel device which has a capacitive touch input function, wherein it comprises a window, a touch panel laminate and an organic EL display panel. In the organic EL display panel device, the touch panel laminate comprises: a first laminate disposed on a side closer to the window, wherein the first laminate comprises an optically transparent first substrate layer made of a PET material, a first transparent electrically conductive layer laminated to one surface of the first substrate layer through a first undercoat layer, and an oligomer blocking layer disposed on the other surface of the first substrate layer; and a second laminate disposed on a side farther from the window with respect to the first laminate, wherein the second laminate comprises an optically transparent second substrate layer made of a PET material, a second transparent electrically conductive layer laminated to one surface of the second substrate layer through a second undercoat layer, and an oligomer blocking layer disposed on the other surface of the second substrate layer.

The first laminate and the second laminate are bonded together through an adhesive layer, and each of the first and second transparent electrically conductive layers is patterned in a given pattern. The first transparent electrically conductive layer is disposed on a side closer to the window with respect to the first substrate layer, and the touch panel laminate is bonded to the window through an optically transparent adhesive layer, on a side having the first transparent electrically conductive layer. The organic EL display panel is disposed on a side opposite to the window with respect to the touch panel laminate, and a polarizing film layer and a λ/4 retardation film layer are disposed between the touch panel laminate and the organic EL display panel, in this order when viewed from the side of the touch panel laminate. The polarizing film layer is bonded to the touch panel laminate through an optically transparent adhesive layer.

According to a fifth aspect of the present invention, there is provided a liquid crystal display panel device which has a capacitive touch input function, wherein it comprises a window, a touch panel laminate and a liquid crystal display panel. In the liquid crystal display panel device, the touch panel laminate comprises: a first laminate disposed on a side closer to the window, wherein the first laminate comprises an optically transparent first substrate layer made of a PET material, a first transparent electrically conductive layer laminated to one surface of the first substrate layer through a first undercoat layer, and an oligomer blocking layer disposed on the other surface of the first substrate layer; and a second laminate disposed on a side farther from the window with respect to the first laminate, wherein the second laminate comprises an optically transparent second substrate layer made of a PET material, a second transparent electrically conductive layer laminated to one surface of the second substrate layer through a second undercoat layer, and an oligomer blocking layer disposed on the other surface of the second substrate layer.

Preferably, at least the first undercoat layer in the first and second undercoat layers is composed of an at least two-layer structured undercoat layer. Specifically, the at least two-layer structured undercoat layer is preferably configured such that a near-side undercoat layer therein on a side closer to the first transparent electrically conductive layer has a refractive index less than that of a far-side undercoat layer therein on a side farther from the first transparent electrically conductive layer, and a thickness less than that of the far-side undercoat layer, wherein the near-side undercoat layer is patterned in the same pattern as that of the first transparent electrically conductive layer, as mentioned above.

The first laminate and the second laminate are bonded together through an adhesive layer, and each of the first and second transparent electrically conductive layers is patterned in a given pattern.

A polarizing film layer and a λ/4 retardation film layer are disposed between the window and the touch panel laminate, in this order when viewed from the side of the window. The first transparent electrically conductive layer is disposed on a side closer to the window with respect to the first substrate layer, and the touch panel laminate is bonded to the λ/4 retardation film layer through an optically transparent adhesive layer, on a side having the first transparent electrically conductive layer. The liquid crystal display panel is disposed on a side opposite to the window with respect to the touch panel laminate, and a second λ/4 retardation film layer and a second polarizing film layer are disposed between the touch panel laminate and the liquid crystal display panel, in this order when viewed from the side of the touch panel laminate. The second λ/4 retardation film layer is bonded to the touch panel laminate through an optically transparent adhesive layer. A third polarizing film layer is disposed on a side opposite to the touch panel laminate with respect to the liquid crystal display panel.

According to a sixth aspect of the present invention, there is provided a display panel device which has a capacitive touch input function, wherein it comprises a window, a capacitive touch panel laminate and a display panel. In the display panel device, the touch panel laminate comprises: an optically transparent first substrate layer; a pattern-shaped first transparent electrically conductive layer laminated to one surface of the first substrate layer; and a pattern-shaped second transparent electrically conductive layer disposed to face the first transparent electrically conductive layer across at least the first substrate layer, wherein the first transparent electrically conductive layer is disposed on a side closer to the window with respect to the first substrate layer. At least two undercoat layers are disposed between the first transparent electrically conductive layer and the first substrate layer. Among the two undercoat layers, one undercoat layer closer to the first transparent electrically conductive layer has a refractive index less than that of the other undercoat layer which is on the side farther from the first transparent electrically conductive layer, and the one undercoat layer has a thickness less than that of the other undercoat layer, wherein the one undercoat layer may be patterned in the same pattern as that of the first transparent electrically conductive layer. Further, a space between the window, and one of the layers closest to the window (e.g., the first transparent electrically conductive layer), is filled with an optically transparent adhesive. Alternatively, as the layer closest to the window, for example, a polarizing layer and a λ/4 retardation film layer to be combined with the polarizing layer can be disposed between the first transparent electrically conductive layer and the window. Alternatively, an optically functional layer usable for other purpose may be disposed between the first transparent electrically conductive layer and the window.

In this display panel device, despite the configuration where the pattern-shaped first transparent electrically conductive layer of the touch panel laminate is disposed close to the window, it becomes possible to significantly reduce the pattern visibility problem that a pattern of the first transparent electrically conductive layer becomes visible through the window due to light reflected by the first transparent electrically conductive layer. Preferably, in this display panel device, the far-side undercoat layer has a thickness of 35 nm or less. More preferably, the near-side undercoat layer has a thickness which is equal to or less than ½ of the thickness of the far-side undercoat layer. A hard coat layer may be disposed between the first substrate layer and the far-side undercoat layer. The second transparent electrically conductive layer may be formed on an optically transparent second substrate layer through an at least one-layer undercoat layer. In this case, the second substrate layer may be disposed on a side opposite to or on a same side as that of the first transparent electrically conductive layer with respect to the second transparent electrically conductive layer.

According to a seventh aspect of the present invention, there is provided a liquid crystal display panel device which has a capacitive touch input function, wherein it comprises a window, a capacitive touch panel laminate and a liquid crystal display panel. In the liquid crystal display panel device, the touch panel laminate comprises: an optically transparent first substrate layer; a pattern-shaped first transparent electrically conductive layer laminated to one surface of the first substrate layer; and a pattern-shaped second transparent electrically conductive layer disposed to face the first transparent electrically conductive layer across at least the first substrate layer, wherein the first transparent electrically conductive layer is disposed on a side closer to the window with respect to the first substrate layer. A first polarizing film layer is disposed between the window and the touch panel laminate, and the first substrate layer has a configuration in which a hard coat layer is formed on each of opposite surfaces of an optically isotropic material layer. An undercoat layer is disposed between the first transparent electrically conductive layer and the first substrate layer. The liquid crystal display panel is bonded to the touch panel laminate through an adhesive layer, and a second polarizing film layer is disposed on a side opposite to the touch panel laminate with respect to the liquid crystal display panel.

In this liquid crystal display panel device, one of the polarizing film layers for the liquid crystal display panel is disposed between the window and the touch panel laminate. Thus, it becomes possible to significantly reduce the pattern visibility problems due to reflection of the pattern of the first transparent electrically conductive layer, by the polarizing film layer and the undercoat formed on the first substrate layer.

In the seventh aspect of the present invention, the second transparent electrically conductive layer may be disposed on an optically transparent second substrate layer through a second undercoat layer. In this case, the second substrate layer may have a configuration in which a hard coat layer is formed on each of opposite surfaces of an optically isotropic material layer, wherein the second transparent electrically conductive layer is disposed closer to the window with respect to the second substrate layer.

As an adhesive for forming the adhesive layer in the display panel device of the present invention, it is possible to use an acrylic-based adhesive, a silicone-based adhesive, polyester-based adhesive, a rubber-based adhesive, or a polyurethane-based adhesive, for example. The adhesives may be used independently or in the form of a combination of two or more of them. Among them, it is preferable to use an acrylic-based adhesive containing, as a primary component or a base polymer, an acrylic-based polymer comprising a primary monomer component consisting of an alkyl(meth)acrylate ester having an alkyl group with a carbon number of 1 to 18 [C1-18 alkyl(meth)acrylate ester]. For example, the C1-18 alkyl (meth)acrylate ester includes methyl(meth)acrylate, ethyl (meth)acrylate, propyl(meth)acrylate, isopropyl(meth)acrylate, butyl(meth)acrylate, isobutyl(meth)acrylate, sec-butyl (meth)acrylate, tert-butyl(meth)acrylate, pentyl(meth) acrylate, hexyl(meth)acrylate, heptyl(meth)acrylate, octyl (meth)acrylate, isooctyl(meth)acrylate, 2-ethylhexyl(meth) acrylate, nonyl(meth)acrylate, isononyl(meth)acrylate, decyl (meth)acrylate, and dodecyl(meth)acrylate. The C1-18 alkyl (meth)acrylate esters may be used independently or in the form of a mixture of two or more of them.

As a component of the acrylic-based polymer, a monomeric component (copolymerizable monomer) having a copolymerizability with respect to the C1-18 alkyl(meth) acrylate ester may be used. In particular, when the acrylic-based polymer is subjected to cross-linking, it is preferable to use, as a copolymerizable monomer, an acrylic-based pressure-sensitive adhesive modifying monomer. As the modifying monomer, it is possible to use any one of various monomers known as an acrylic-based pressure-sensitive adhesive modifying monomer, for example. The copolymerizable monomers may be used independently or in the form of a combination of two or more of them. Specifically, the copolymerizable monomer includes, for example, a copolymerizable monomer having one of various functional groups (particularly, polar groups) (i.e., a functional group-containing copolymerizable monomer), a styrene-based monomer, such as styrene, and an α-olefin based monomer, such as ethylene or propylene. The functional group-containing copolymerizable monomer may include: vinylesters, such as vinyl acetate; cyano-containing copolymerizable monomer, such as (meth) acrylonitrile; amide-containing copolymerizable monomer, such as (meth)acrylamide, or N,N-dimethyl(meth)acrylamide; hydroxy-containing copolymerizable monomer, such as 2-hydroxyethyl(meth)acrylate, 3-hydroxypropyl(meth) acrylate, 4-hydroxybutyl(meth)acrylate, or 6-hydroxyhexyl (meth)acrylate; epoxy-containing copolymerizable monomer, such as glycidyl(meth)acrylate; amino-containing copolymerizable monomer, such as N,N-dimethylamine ethyl alkyl(meth)acrylate ester; and carboxy-containing copolymerizable monomer, such as (meth)acrylic acid, crotonic acid, itaconic acid, maleic acid, maleic anhydride or fumaric acid. As the modifying monomer, it is possible to use the functional group-containing copolymerizable monomers. Among them, a hydroxy-containing copolymerizable monomer and a carboxy-containing copolymerizable monomer are preferable, and an acrylic acid is particularly preferable. The acrylic-based polymer can be cross-linked by utilizing a functional group (particularly, polar group) derived from the modifying monomer. As a polymerization method for obtaining the acrylic-based polymer, it is possible to employ a solution polymerization method designed to be performed using a polymerization initiator such as azo-based compound or peroxide, an emulsion polymerization method, a bulk polymerization method, or a polymerization method designed to be performed using a photopolymerization initiator and in combination with irradiation with light or radiation.

As a cross-linking agent, a multifunctional melamine compound, a multifunctional epoxy compound and a multifunctional isocyanate compound are particularly preferable. The cross-linking agents may be used independently or in the form of a mixture of two or more of them. The multifunctional melamine compound includes methylated trimethylolmelamine, and butylated hexamethylolmelamine, for example. The multifunctional epoxy compound includes diglycidylaniline and glycerol diglycidyl ether, for example. For example, an amount of the multifunctional melamine compound and/or the multifunctional epoxy compound to be used is set in the range of 0.001 to 10 weight parts, preferably, in the range of 0.01 to 5 weight parts, with respect to 100 weight parts of the above polymer. The multifunctional isocyanate compound includes, for example, tolylene diisocyanate, hexamethylene diisocyanate, polymethylenepolyphenyl isocyanate, diphenylmethane diisocyanate, diphenylmethane diisocyanate dimer, reaction product between trimethylol propane and tolylene diisocyanate, reaction product between trimethylol propane and hexamethylene diisocyanate, polyether polyisocyanate, and polyester polyisocyanate. For example, an amount of the multifunctional isocyanate compound to be used is set in the range of 0.01 to 20 weight parts, preferably, in the range of 0.05 to 15 weight parts, with respect to 100 weight parts of the above polymer.

Preferably, the adhesive layer has high transparency. For example, it is desirable that a total light transmittance (based on JIS K 7136) in a visible light wavelength range is 85% or more (preferably, 87% or more, more preferably, 90% or more).

A haze value (based on JIS K 7136) of the adhesive sheet 1 which may be of a type having adhesive coatings on both sides may be selectively set to 2.0% or less (preferably, 1.0% or less, more preferably, 0.5% or less).

Each of the first and second substrate layers is formed of a polyethylene terephthalate (PET) film or an optically isotropic material. The undercoat layer is designed to prevent internal reflection, and related information, such as usable materials and anti-reflection functions, is described in detail in the Patent Document 5. In the present invention, the materials described in the Patent Document 5 may be used for the undercoat layer.

Effect of the Invention

As mentioned above, in a display panel device having a capacitive touch input function, the present invention makes it possible to substantially prevent the undesirable situation where the pattern of the transparent electrically conductive layer of the touch panel laminate becomes visible through the window due to internal reflection of light, causing deterioration in display quality. In addition, the present invention makes it possible to obtain a display panel device for a capacitive touch input function, with a thin layer configuration allowing convenient handling.

BRIEF DESCRIPTION OF THE DRAWINGS

FIGS. 14(a) and 14(b) illustrate a coating and laminating station for the process illustrated in FIG. 13, wherein FIG. 14(a) is a schematic diagram of the entire station, and FIG. 14(b) is a schematic sectional view of an adhesive laminate after lamination.

FIGS. 15(a) and 15(b) illustrate a station for producing a polarizer laminate, wherein FIG. 15(a) is a schematic diagram of the entire station, and FIG. 15(b) is a schematic sectional view of a polarizer laminate to be obtained.

FIGS. 16(a) and 16(b) illustrate a process of producing a polarization functional laminate, wherein FIG. 16(a) is a block diagram of the entire process, and FIG. 16(b) is a schematic sectional view of a laminate to be obtained.

FIGS. 17(a) and 17(b) illustrate a process of forming an undercoat layer on a substrate as an element layer of a touch panel laminate, wherein FIG. 17(a) is a schematic block diagram of the process, and FIG. 17(b) is a schematic sectional view of a substrate coated with an undercoat layer.

FIGS. 18(a) to 18(c) illustrate a process of forming an electrically conductive layer on the undercoat layer-coated substrate, wherein FIGS. 18(a), 18(b) and 18(c) are, respectively, a schematic block diagram of the process, a sectional view of an electrically conductive laminate to be obtained, and a sectional view of an adhesive layer-laminated electrically conductive laminate to be obtained by laminating the adhesive layer to the electrically conductive laminate.

DESCRIPTION OF EMBODIMENTS

Figure 1:
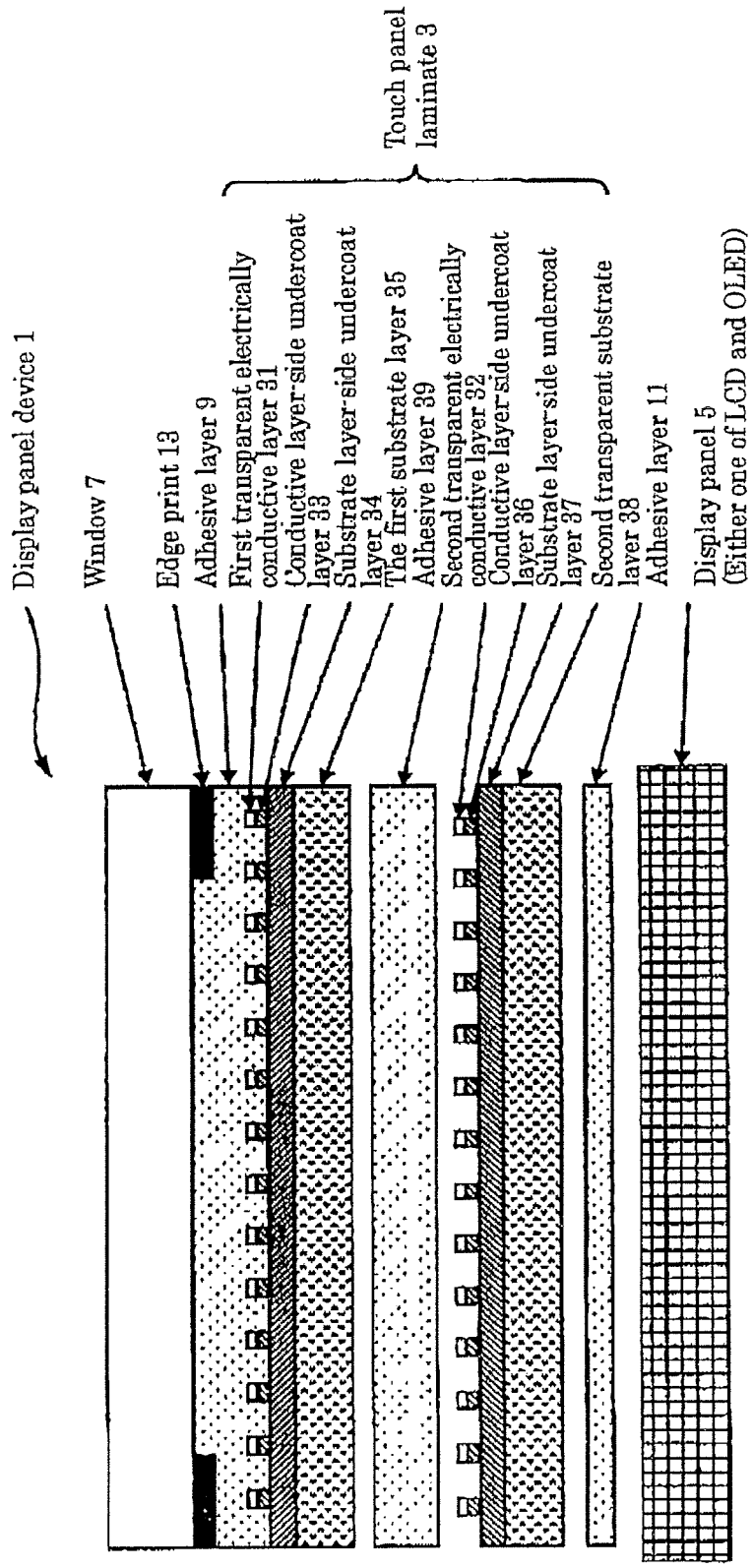
FIG. 1 is a schematic sectional view illustrating a layer configuration of a display panel device according to one embodiment of the present invention.

Referring to FIG. 1, a display panel device 1 according to one embodiment of the present invention comprises a touch panel laminate 3, a display panel 5 and a window 7. The touch panel laminate 3 comprises an optically transparent first electrically conductive layer 31 and an optically transparent second electrically conductive layer 32. The first electrically conductive layer 31 is disposed on an optically transparent first substrate layer 35 through two optically transparent undercoat layers 33, 34. The undercoat layer 33 will hereinafter be referred to as "conductive layer-side undercoat layer", and the undercoat layer 34 will hereinafter be referred to as "substrate layer-side undercoat layer". Similarly, the second electrically conductive layer 32 is disposed on an optically transparent second substrate layer 38 through two optically transparent undercoat layers 36, 37. The first and second transparent electrically conductive layers 31, 32 are attached and formed, respectively, onto the conductive layer-side undercoats 33, 36, for example, by sputtering. This touch panel laminate 3 makes up a capacitive touch input sensor unit. As is well known in this technical field, each of the first and second electrically conductive layers 31, 32 is patterned in a desired pattern.

As illustrated in FIG. 1, the first transparent electrically conductive layer is disposed on a side closer to the window 7 with respect to the first substrate layer 35. The first substrate layer 35 is bonded to the second transparent electrically conductive layer 32 through an optically transparent adhesive layer 39.

In this embodiment, each of the conductive layer-side undercoats 33, 36 is patterned in the same manner as that in a corresponding one of the electrically conductive layers 31, 32. Each of the conductive layer-side undercoats 33, 36 is made of a material having a refractive index less than that of a corresponding one of the substrate layer-side undercoat layers 34, 37. Further, each of the conductive layer-side undercoats 33, 36 is formed to have a thickness less than that of the corresponding one of the substrate layer-side hard coat layers 34, 37. The patterning of the conductive layer-side undercoat layer 33 and the above relationship between the conductive layer-side undercoat 33 and the substrate layer-side hard coat layer 34 in terms of refractive index and thickness make it possible to significantly reduce the pattern visibility problem that a pattern of the first electrically conductive layer 31 disposed close to the window 7 becomes visible through the window 7 by reflected light from the first electrically conductive layer. It should be noted that the patterning of the conductive layer-side undercoat layer 33 and the above relationship between the conductive layer-side undercoat 33 and the substrate layer-side hard coat layer 34 in terms of refractive index and thickness are not essential, although they are desirable configurations for reducing the pattern visibility problem due to reflected light from the second transparent electrically conductive layer 32.

In this embodiment, a space between the first transparent electrically conductive layer 31 and the window 7 is filled with an optically transparent adhesive layer 9. That is, the window 7 is bonded to the touch panel laminate 3 through the adhesive layer 9, over the entire surface thereof. As illustrated in FIG. 1, an edge print 13 is provided on the window 7 along an edge of an inner (back) surface thereof. Thus, as seen in FIG. 1, a step is formed due to the edge print 13. However, in the configuration illustrated in FIG. 1, the window 7 is bonded to the touch panel laminate 3 through the adhesive layer 9, over the entire surface thereof, so that the step arising from the edge print 13 is filled with an adhesive of the adhesive layer 9. Thus, in the embodiment illustrated in FIG. 1, no air gap is formed between the window 7 and the touch panel laminate 3, so that it becomes possible to suppress internal reflection which would otherwise be caused by an air gap therebetween. Therefore, this configuration can further reduce the pattern visibility problem due to reflected light from the first transparent electrically conductive layer 31, as compared to the case where there is an air gap between the window 7 and the touch panel laminate 3.

The display panel 5 may be composed of a liquid crystal display panel or an organic EL display panel. In the case where a liquid crystal display panel is used, a polarizing film layer is appropriately adhesively bonded to the liquid crystal display panel. The display panel 5 is bonded to the second substrate layer 38 through an optically transparent adhesive layer 11.

Figure 2:
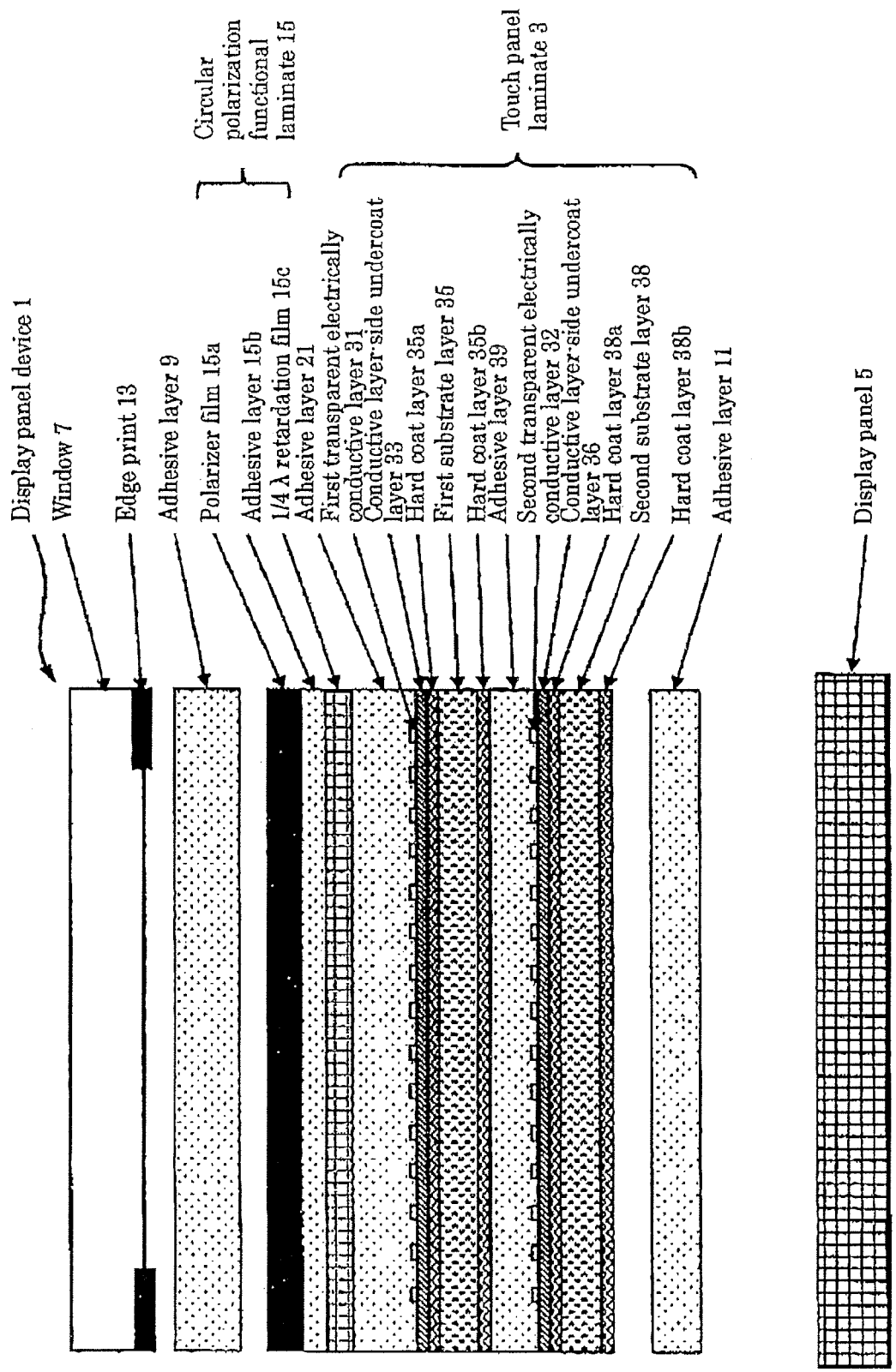
FIG. 2 is a schematic sectional view similar to FIG. 1 but showing an example wherein an organic EL display panel is used as a display panel, and an optically isotropic material is used for a substrate of a touch panel laminate.

FIG. 2 illustrates another embodiment of the present invention. In this embodiment, an element or component corresponding to that in FIG. 1 is assigned with the same reference numeral or code, and its detailed description will be omitted. In the configuration illustrated in FIG. 2, a polarization functional laminate 15 making up a circularly polarizing plate is disposed between a touch panel laminate 3 and a window 7. The circular polarization functional laminate 15 comprises a polarizer film 15a disposed on the side of the window 7, and a ¼λ retardation film 15c bonded to the polarizer film 15a through the adhesive layer 15b. In the display panel device 1, the polarizer film 15a of the polarization functional laminate 15 is bonded to the window 15 through an optically transparent adhesive 9, and the ¼λ retardation film 15c is bonded to the touch panel laminate 3 through an optically transparent adhesive layer 21.

In this embodiment, each of first and second substrate layers 35, 38 is made of an optically isotropic material such as a polycarbonate-based resin. Further, two hard coat layers 35a, 35b are adhesively bonded, respectively, to opposite surfaces of the first substrate layer 35, and two hard coat layers 38a, 38b are adhesively bonded, respectively, to opposite surfaces of the second substrate layer 38. A display panel 5 is composed of an organic EL display panel.

In the embodiment illustrated in FIG. 2, the polarization functional laminate 15 making up a circularly polarizing plate is disposed between the window 7 and the touch panel laminate 3. Alternatively, a configuration may be employed in which the polarization functional laminate 15 making up a circularly polarizing plate is disposed between the touch panel laminate 3 and the display panel 5.

Figure 3:
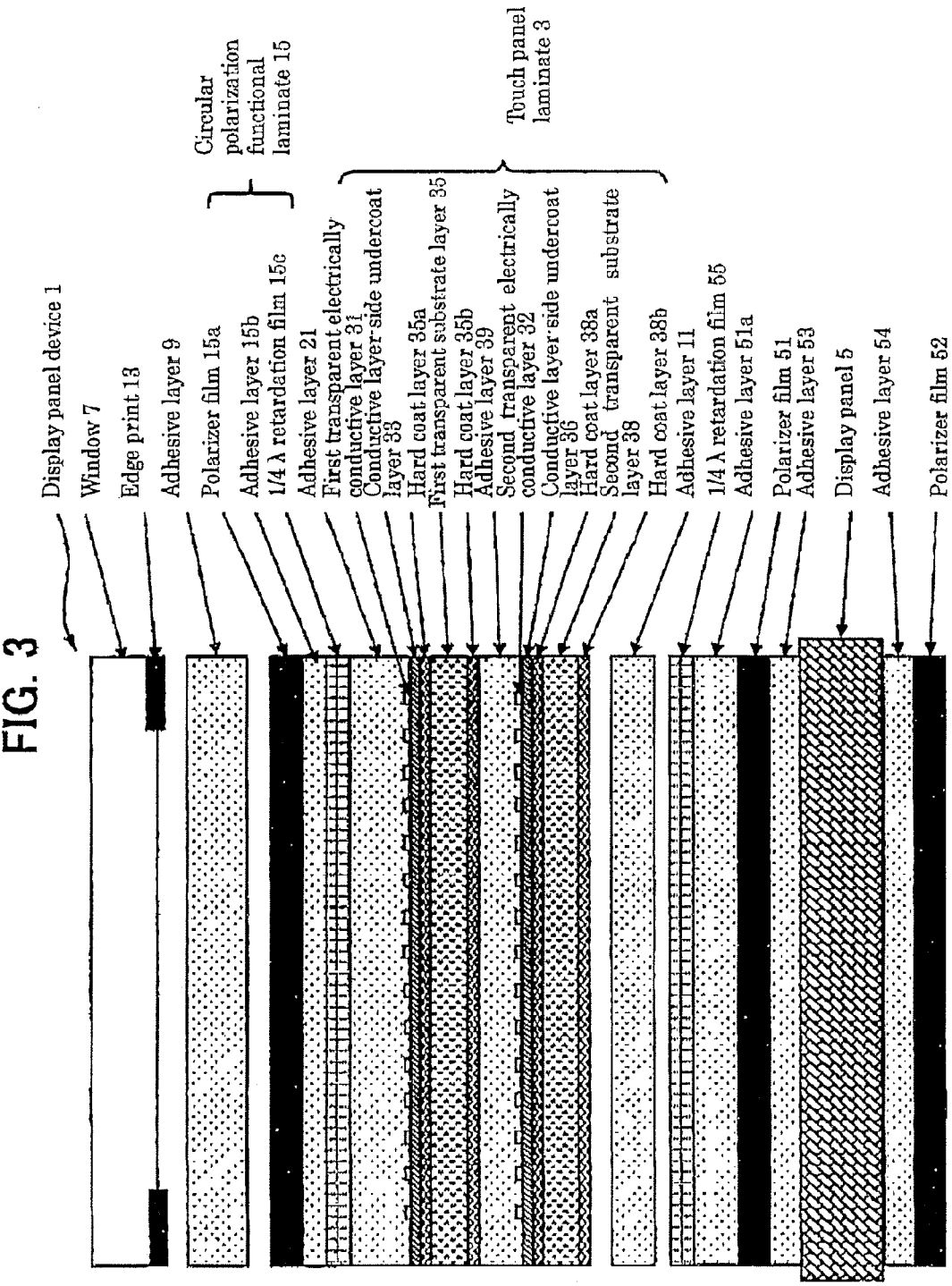
FIG. 3 is a sectional view similar to FIG. 1 but showing an example wherein a liquid crystal display panel is used as the display panel, and an optically isotropic material is used for the substrate of the touch panel laminate.

FIG. 3 is a sectional view illustrating a modification of the display panel device 1 illustrated in FIG. 2. In the modified embodiment illustrated in FIG. 3, configurations of the window 7 and the touch panel laminate 3 are the same as those in the embodiment illustrated in FIG. 2. In this modified embodiment, the display panel 5 is a liquid crystal display panel. Therefore, two polarizer film layers 51, 52 are bonded, respectively, to opposite surfaces of the display panel 5 through two adhesive layers 53, 54. Further, on the side of the touch panel laminate 3, a ¼λ retardation film 55 is disposed between the touch panel laminate 3 and the polarizer film 51. The ¼λ retardation film 55 has one surface bonded to the touch panel laminate 3 through an adhesive layer 11, and the other surface bonded to the polarizer film 51 through an adhesive layer 51a. The ¼λ retardation film 55 is provided to match a polarization state with respect to the polarization functional laminate 15 making up a circularly polarizing plate.

Figure 4:
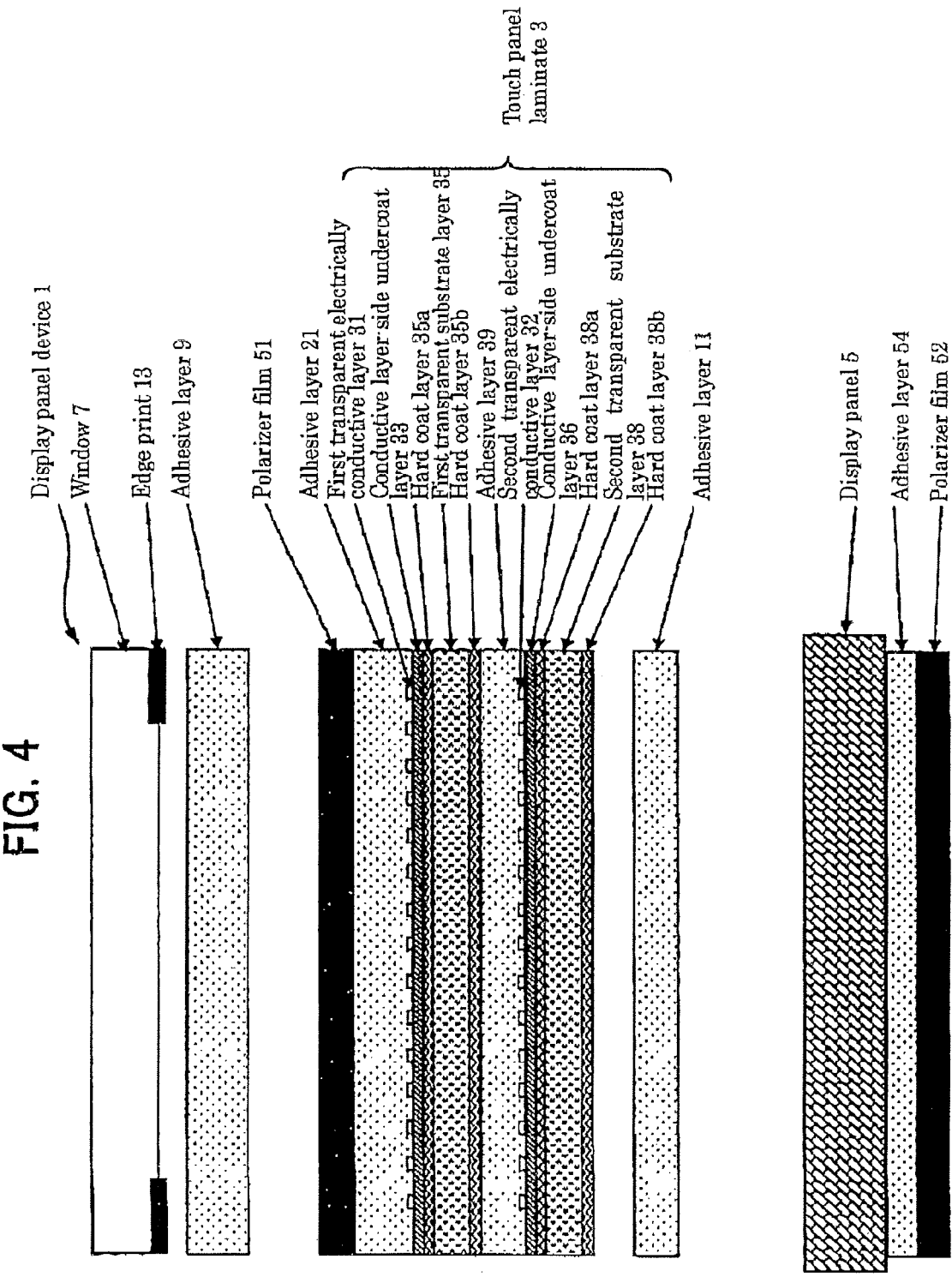
FIG. 4 is a sectional view illustrating one example of a modification of the display panel device according to the embodiment illustrated in FIG. 3, wherein a liquid crystal display panel is used as the display panel.

FIG. 4 is a sectional view illustrating a modification of the embodiment illustrated in FIG. 3. In this modified embodiment, the circular polarization functional laminate 15 is omitted, and the polarizer film 51 to be combined with the liquid crystal display panel 5 is disposed at the position. This configuration allows the display panel device 1 to be reduced in the number of layers, so that it becomes possible to obtain a generally thinned device. In this layout, the polarizer film layer 51 contributes to reduction in the patter visibility.

Figure 5:
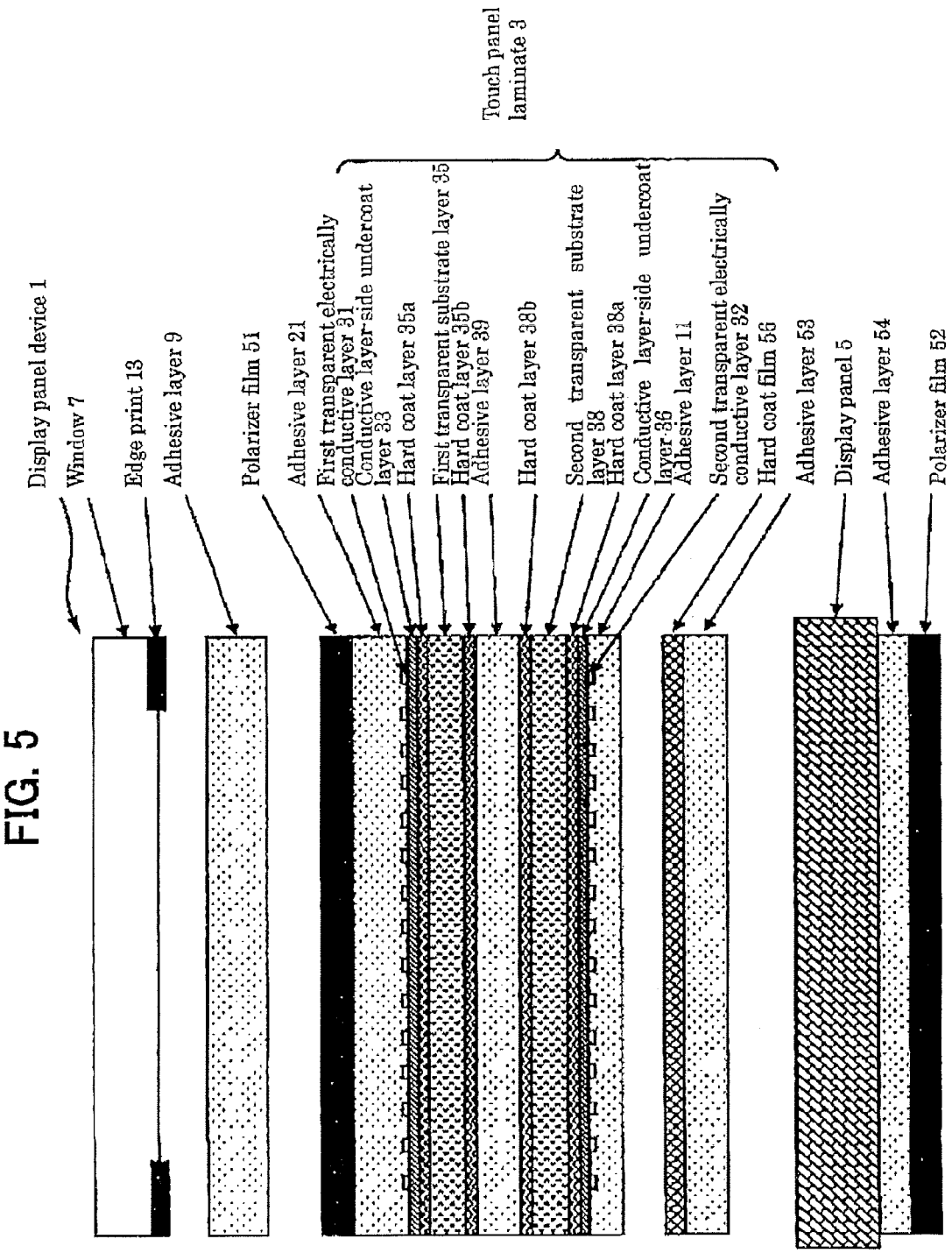
FIG. 5 is a sectional view illustrating one example of a modification of the display panel device according to the embodiment illustrated in FIG. 3, wherein a liquid crystal display panel is used as the display panel.

FIG. 5 is a sectional view illustrating a modification of the display panel device 1 illustrated in FIG. 4. This modified embodiment is different from the embodiment illustrated in FIG. 4, in that the second transparent electrically conductive layer 32 of the touch panel laminate 3 is dispose on the side of the display panel 5 with respect to the second transparent substrate layer 38. A hard coat film layer 56 for protecting a surface of the display panel 5 is disposed between the touch panel laminate 3 and the display panel 5. The hard coat film layer 56 has one surface bonded to the touch panel laminate 3 through the adhesive layer 11, and the other surface bonded to the display panel 5 through an adhesive layer 53.

Figure 6:
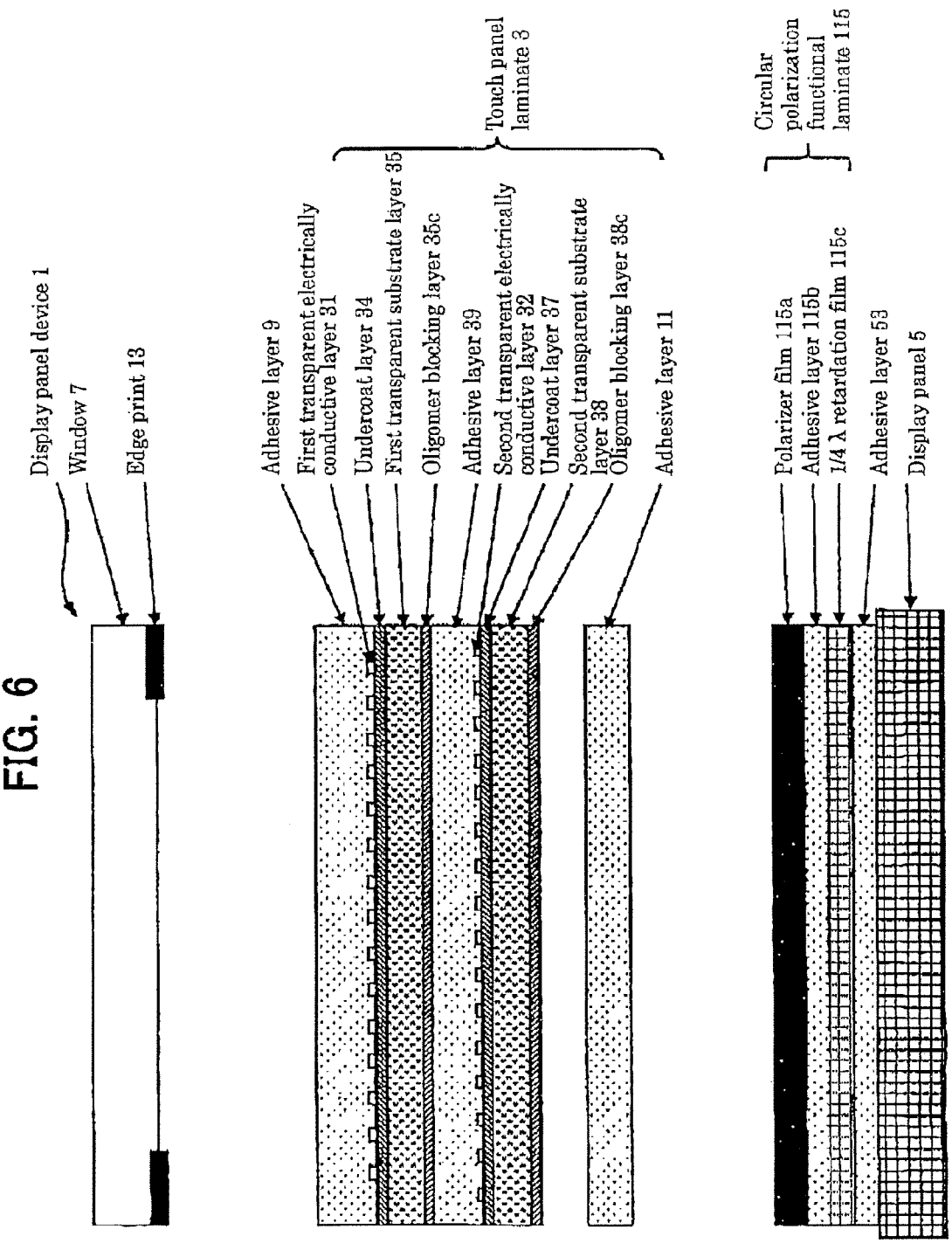
FIG. 6 is a sectional view illustrating a display panel device according to another embodiment of the present invention, wherein an organic EL display panel is used as a display panel.

FIG. 6 illustrates yet another embodiment of the present invention, wherein an organic EL display panel is used as a display panel 5, and each transparent substrate of a touch panel laminate 3 is made of a polyethylene terephthalate (PET) resin. The touch panel laminate 3 comprises a first transparent electrically conductive layer 31 disposed on a first transparent substrate layer 35 made of PET, through an undercoat layer 34, and a second transparent electrically conductive layer 32 disposed on a second transparent substrate layer 38 made of PET, through an undercoat layer 37. An oligomer blocking layer 35c is disposed on a surface of the first transparent substrate layer 35 on a side opposite to the transparent electrically conductive layer 31, and an oligomer blocking layer 38c is disposed on a surface of the second transparent substrate layer 38 on a side opposite to the transparent electrically conductive layer 32. A circular polarization functional laminate 115 is disposed between the touch panel laminate 3 and the display panel 5. The circular polarization functional laminate 115 comprises a polarizer film 115a, and a ¼λ retardation film 115c bonded to the polarizer film 115a through an adhesive layer 115b. The polarizer film 115a is bonded to the touch panel laminate 3 through an adhesive layer 11, and the ¼λ retardation film 115c is bonded to the display panel 5 through an adhesive layer 53. In this embodiment, the undercoat layer 34 (37) can be provided between the transparent substrate layers 35 (38) and the electrically conductive layers 31 (32), and patterned in the same manner as that for the electrically conductive layers 31, 32, so as to reduce the pattern visibility problem, as with the embodiment illustrated in FIG. 1.

Figure 7:
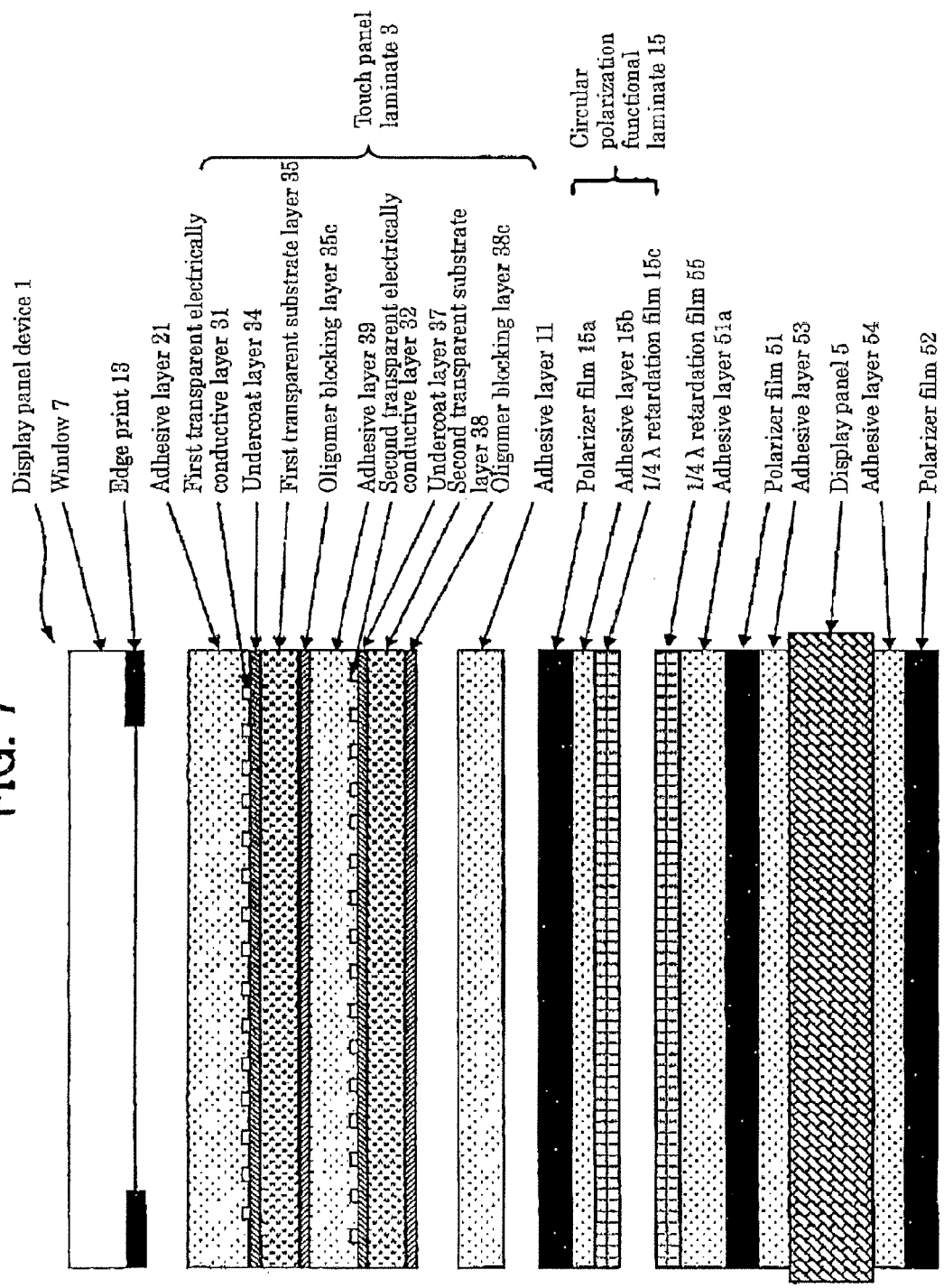
FIG. 7 is a sectional view illustrating one example of a modification of the display panel device according to the embodiment illustrated in FIG. 6, wherein a liquid crystal display panel is used as the display panel.

FIG. 7 illustrates a modification of the embodiment illustrated in FIG. 6, wherein a liquid crystal display panel is used as the display panel 5. The touch panel laminate 3 has the same configuration as that in the embodiment illustrated in FIG. 6. A circular polarization functional laminate 15 for producing a circularly polarizing plate, similar to that in the embodiment illustrated in FIG. 2, is disposed at a side opposite to the window 7 with respect to the touch panel laminate 3. Although not illustrated in FIG. 7, the polarizer film 15a of the polarization functional laminate 15 may be bonded to the touch panel laminate 3 through an adhesive layer such as the adhesive layer 9 illustrated in FIG. 2. In this modified embodiment, the display panel 5 is composed of a liquid crystal display panel. Thus, the display panel 5 is adhesively bonded to the touch panel laminate 3 while interposing a ¼λ retardation film 55 and a polarizer film 51 therebetween.

Figure 8:
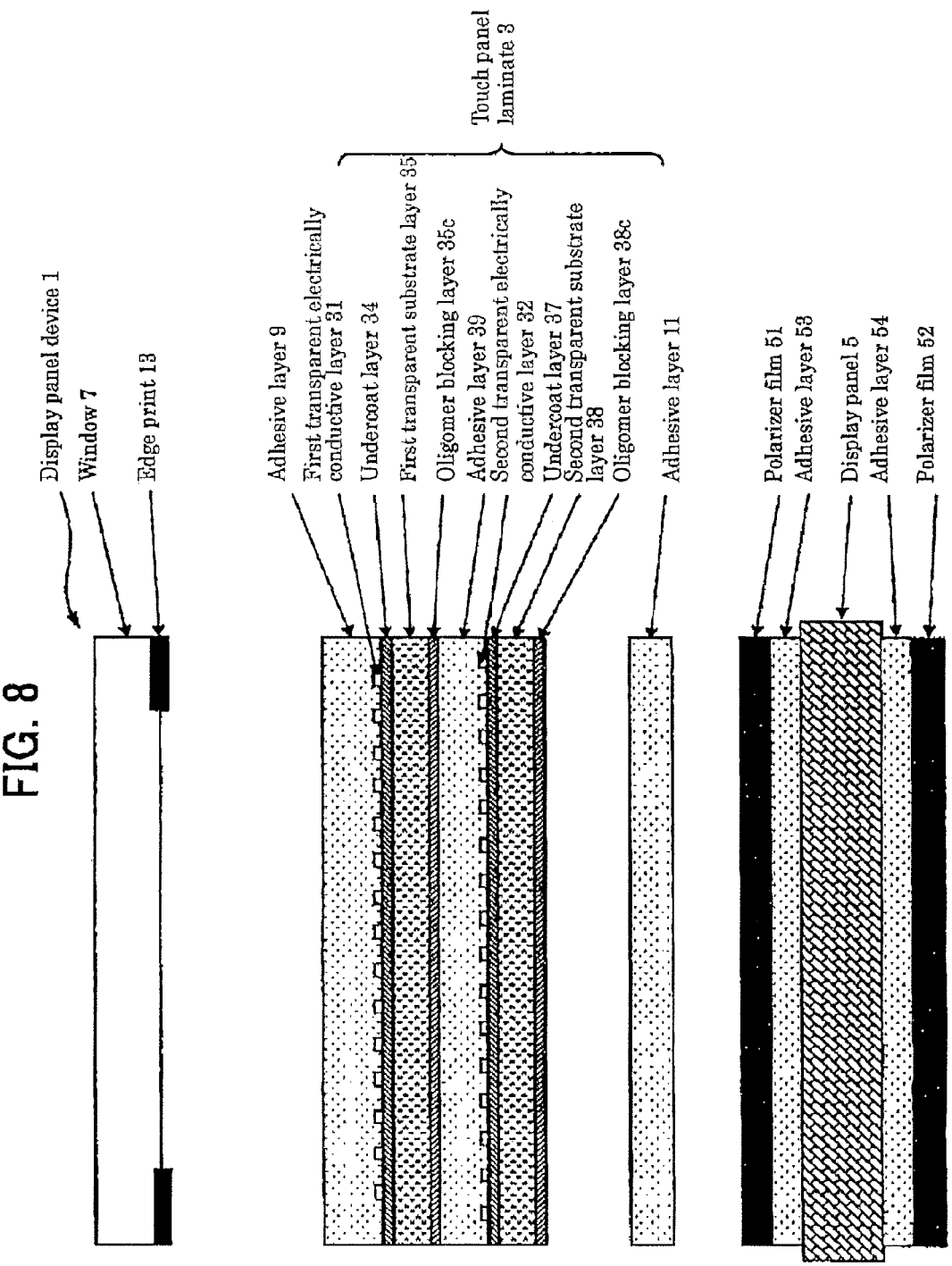
FIG. 8 is a sectional view illustrating another example of the modification of the display panel device according to the embodiment illustrated in FIG. 6, wherein a liquid crystal display panel is used as the display panel.

FIG. 8 illustrates a further modification of the configuration in FIG. 7. The touch panel laminate 3 has the same configuration as that in the embodiments illustrated in FIGS. 6 and 7. In this modified embodiment, the polarization functional laminate 15 is removed from the embodiment in FIG. 7. In the configuration illustrated in FIG. 7, the ¼λ retardation film 55 disposed adjacent to the display panel 5 is also omitted.

Figure 9:
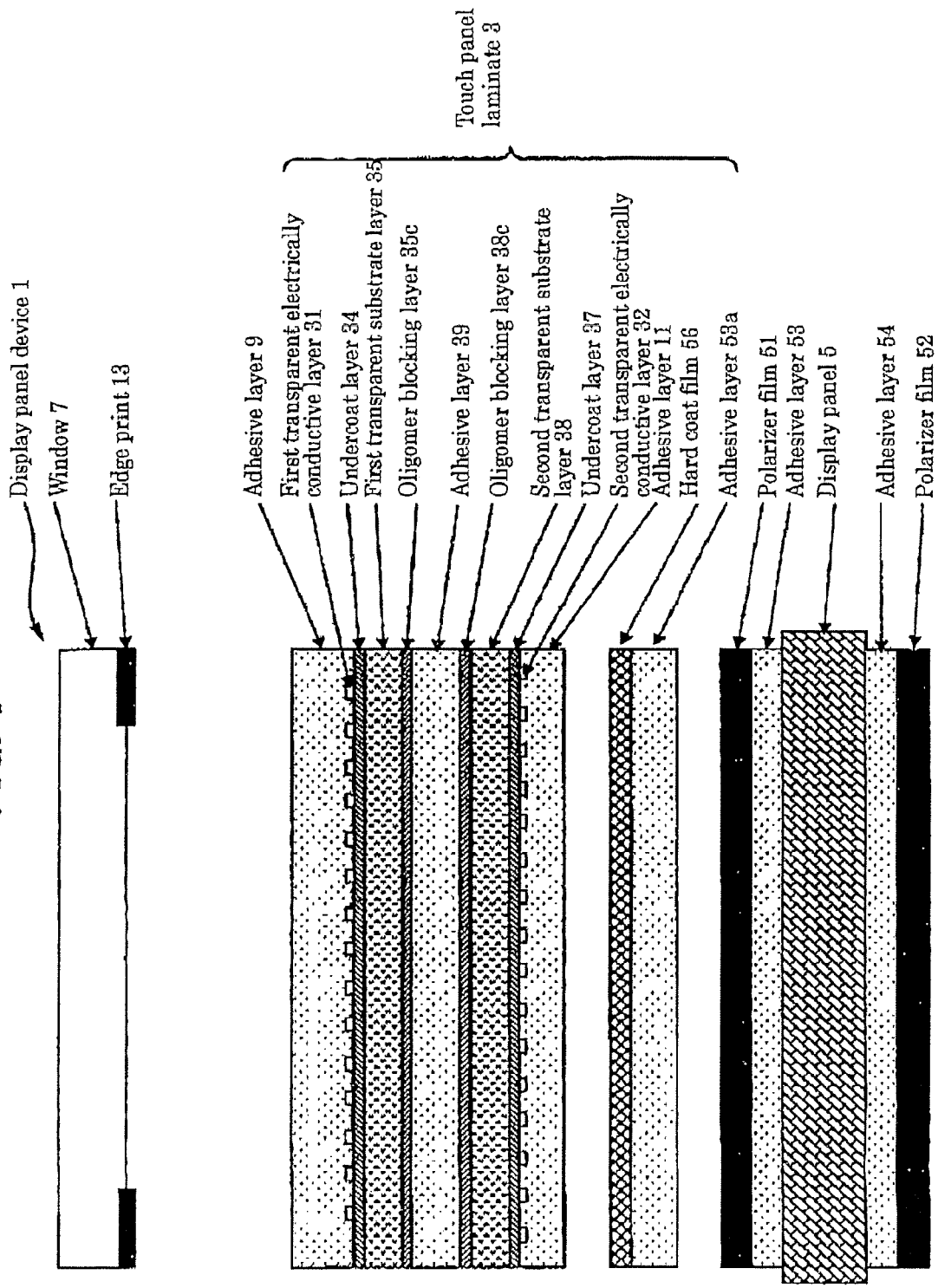
FIG. 9 is a sectional view illustrating yet another example of the modification of the display panel device according to the embodiment illustrated in FIG. 6, wherein a liquid crystal display panel is used as the display panel.

FIG. 9 illustrates a further modification of the configuration in FIG. 8. With regard to the touch panel laminate 3, this modified embodiment has the same configuration as that in FIG. 8, except that the second transparent electrically conductive layer 32 is disposed on the side of the display panel with respect to the second transparent substrate layer 38. Further, a hard coat film layer 56 for protecting a surface of the display panel 5 is disposed between the touch panel laminate 3 and the display panel 5, as in the embodiment illustrated in FIG. 5.

Figure 10:
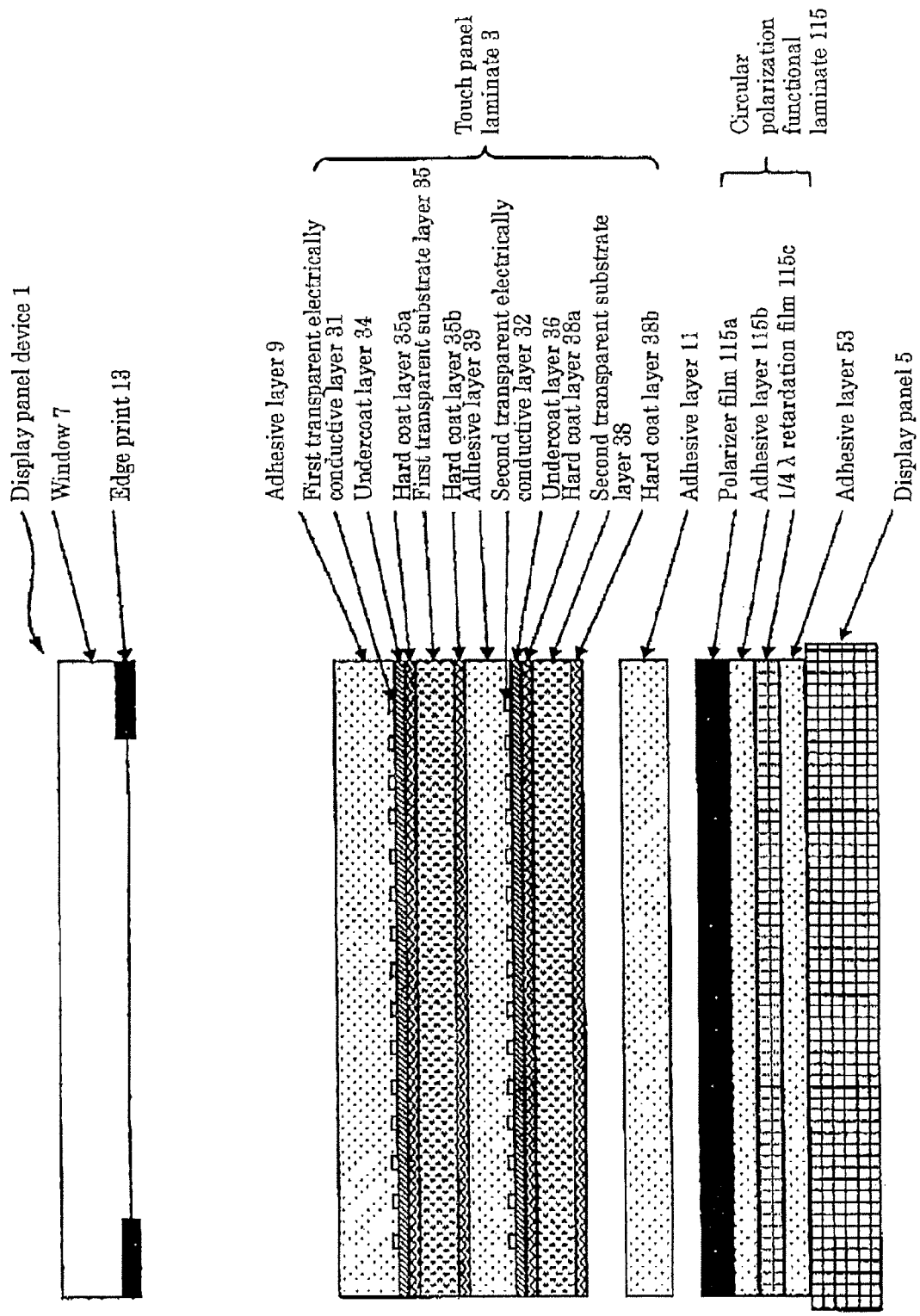
FIG. 10 is a sectional view illustrating still another example of the modification of the display panel device according to the embodiment illustrated in FIG. 6, wherein an organic EL display panel is used as the display panel.
Figure 11:
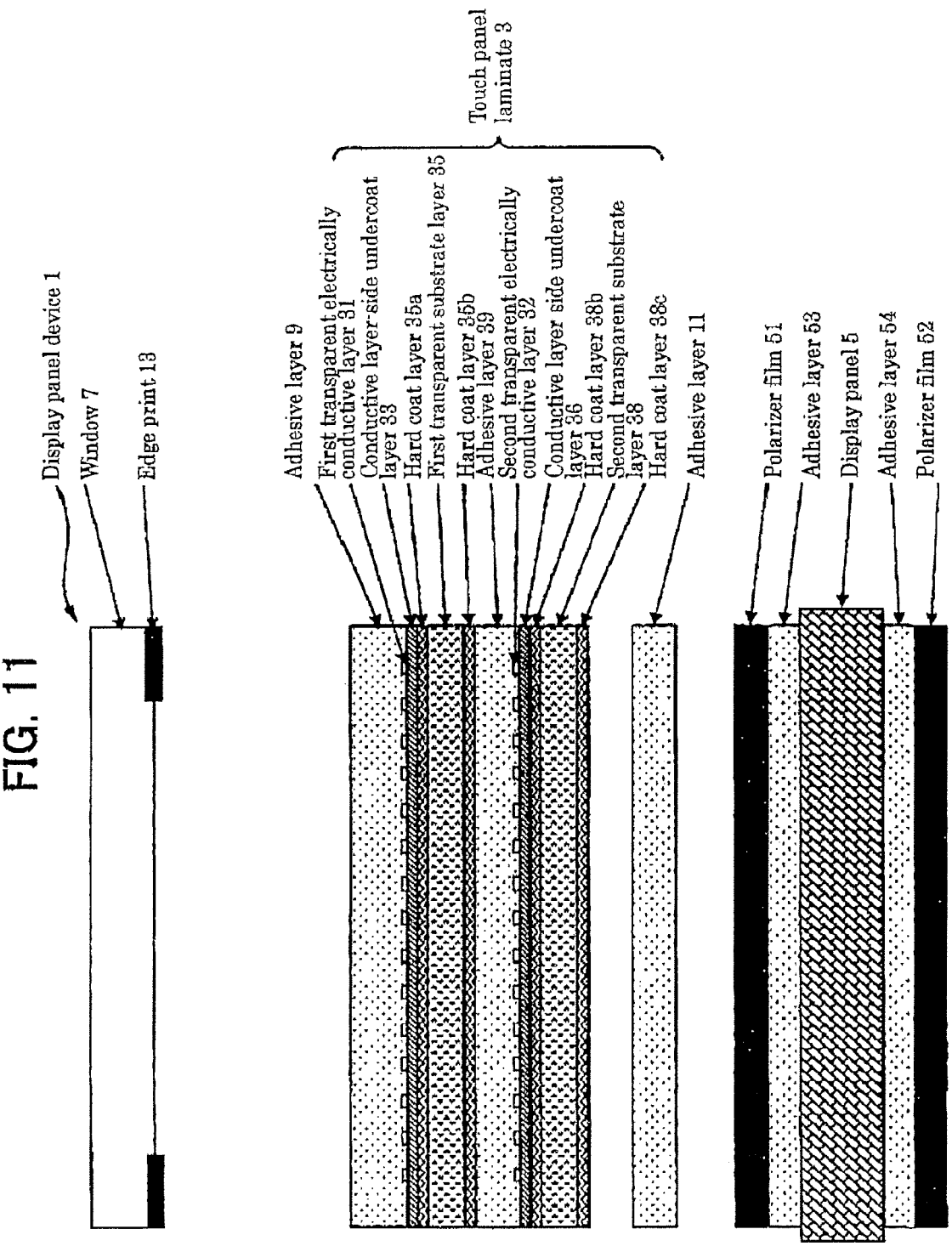
FIG. 11 is a sectional view illustrating yet still another example of the modification of the display panel device according to the embodiment illustrated in FIG. 6, wherein a liquid crystal display panel is used as the display panel.
Figure 12:
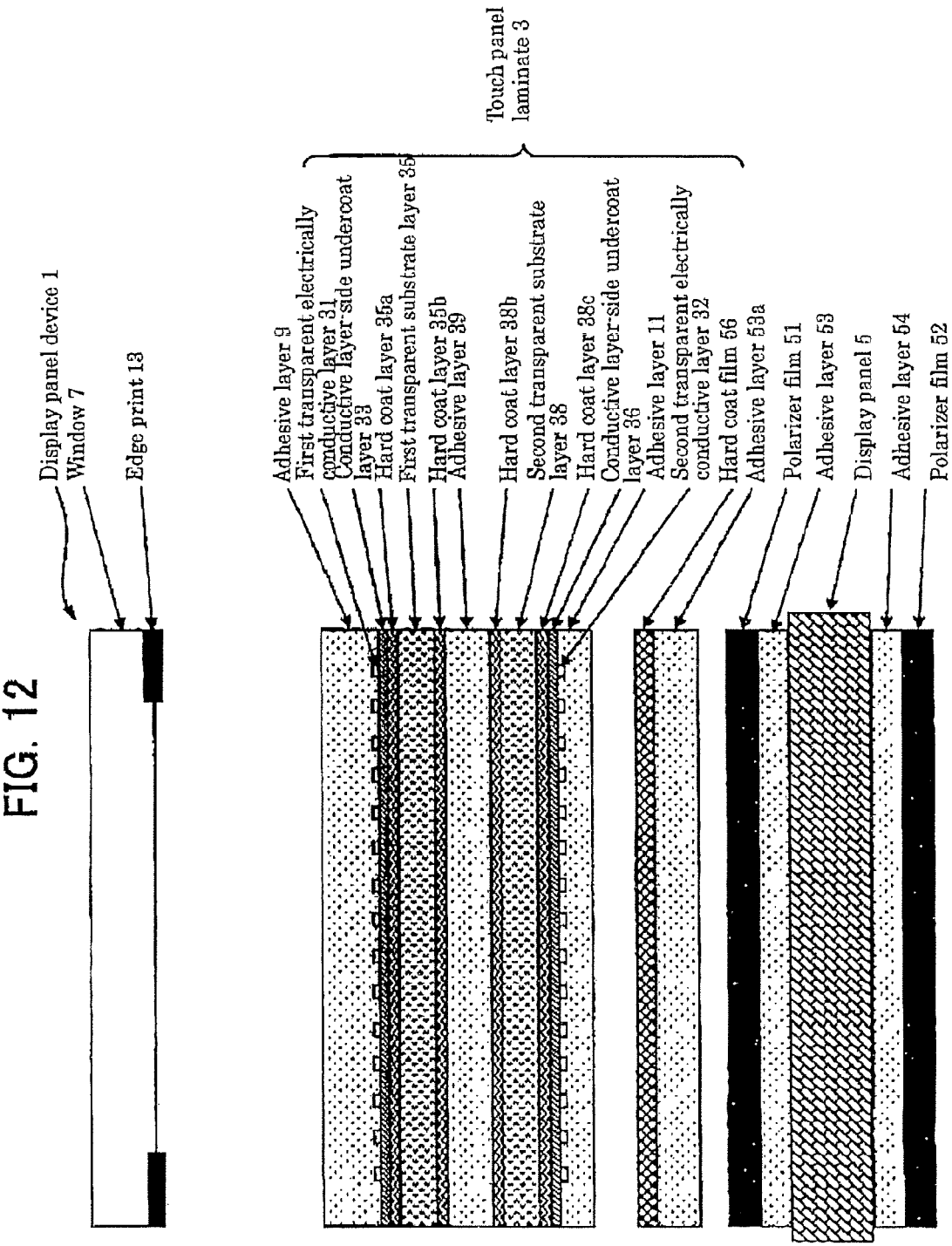
FIG. 12 is a sectional view illustrating another further example of the modification of the display panel device according to the embodiment illustrated in FIG. 6, wherein a liquid crystal display panel is used as the display panel.

FIG. 10 illustrates another modification of the embodiment illustrated in FIG. 6. In this modification, the touch panel laminate 3 has the same configuration as that in the embodiment illustrated in FIG. 3 or 4. The remaining configuration is the same as that in FIG. 6. FIG. 11 illustrates a modification of the configuration in FIG. 9, wherein the hard coat film 56 and the adhesive layer 53a in FIG. 9 are omitted. FIG. 12 illustrates a modification of the configuration in FIG. 9, wherein the touch panel laminate 3 is replaced with that in the modified embodiment illustrated in FIG. 5.

An example of each layer for use in production of the display panel device of the present invention will be described in detail below.

(Formation of Optically Transparent Adhesive Layer)

Figure 13:
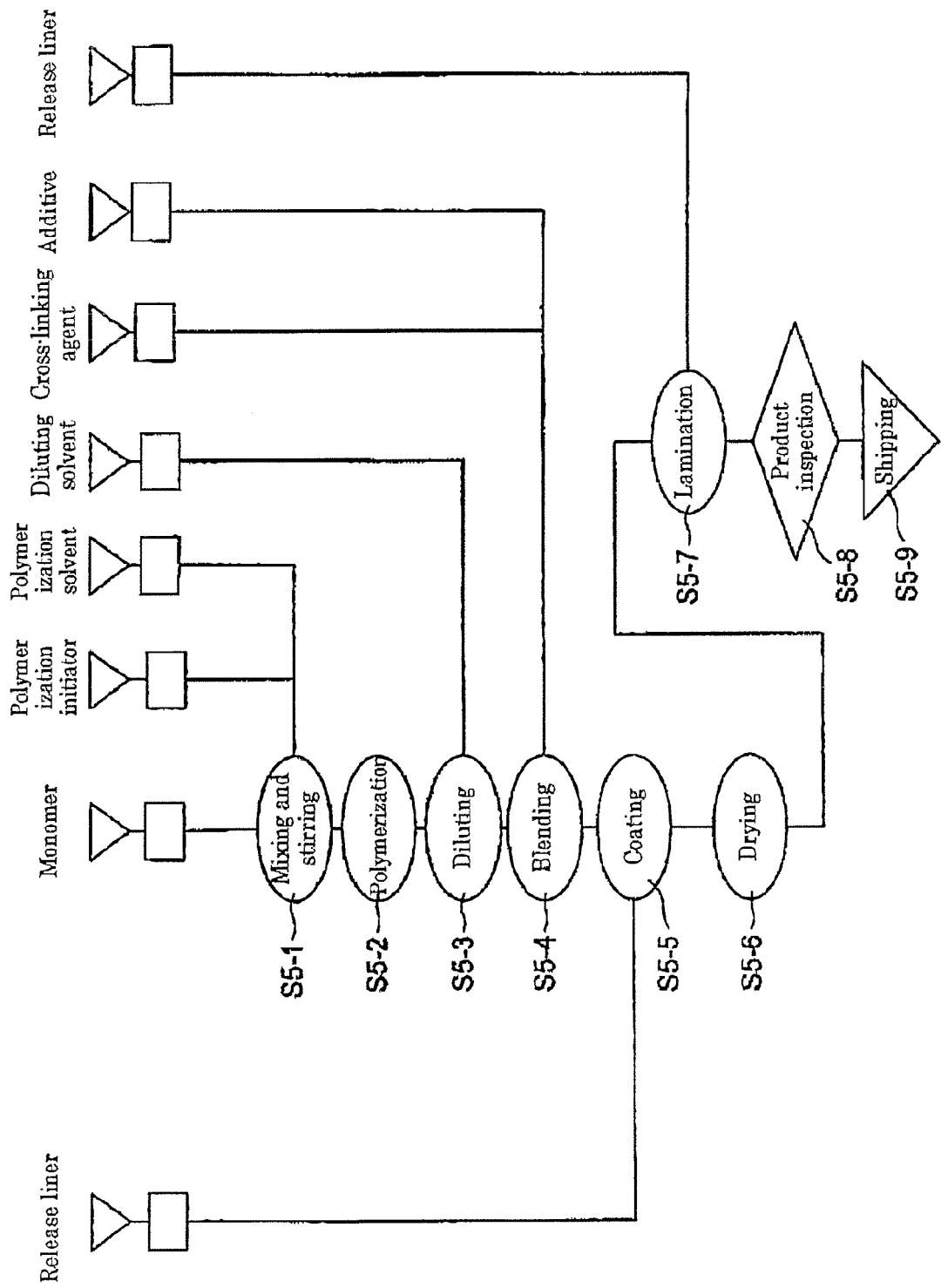
FIG. 13 is a process diagram illustrating a process of producing a sheet comprising an optically transparent adhesive layer.

FIG. 13 is a process diagram illustrating a process of producing an optically transparent adhesive layer usable in the present invention. First of all, a monomer as a basic raw material of an adhesive and a polymerization initiator are mixed and stirred together with a solvent. As the monomer, a mixture consisting of 70 weight parts of 2-methoxyethyl acrylate, 29 weight parts of 2-ethylhexyl acrylate, and 1 weight part of 4-hydroxybutyl acrylate is used. 0.2 weight parts of 2,2'-azobisisobutyronitrile is used as the polymerization initiator, and 100 weight parts of ethyl acetate is used as a polymerization solvent. These materials are put in a separable flask, and stirred for one hour while introducing nitrogen gas thereinto (S5-1). After removing oxygen in a polymerization system in the above manner, the solution is heated up to 63° C. to conduct a reaction for 10 hours (S5-2), and then toluene is added to obtain an acrylic-based polymer solution having a solid content concentration of 25 weight % (S5-3). This acrylic-based polymer solution will hereinafter be referred to occasionally as "acrylic-based polymer solution A". Further, an acrylic-based polymer contained in the acrylic-based polymer solution A will hereinafter be referred to occasionally as "acrylic-based polymer A". A weight-average molecular weight Mw of the acrylic-based polymer A is 1500,000. The weight-average molecular weight Mw can be measured by a gel permeation chromatography (GPC). Specifically, as a GPC measurement device, "HLC-8120 GPC" (trade name, produced by Tosoh Corporation) may be used. The weight-average molecular weight Mw can be obtained as a value on a polystyrene equivalent basis by performing a measurement under the following GPC measurement conditions.

GPC Measurement Conditions
Concentration of sample: 0.2 weight % (tetrahydrofuran solution)
Injection amount of sample: 10 μL
Eluant: tetrahydrofuran (THF)
Flow rate (flow velocity): 0.6 mL/min
Column temperature (measurement temperature): 40° C.
Column: "TSKgelSuper HM-H/H4000/H3000/H2000 (trade name, produced by Tosoh Corporation)
Detector: differential refractometer (RI)

A cross-linking agent and an additive are blended with the polymerized acrylic-based polymer to obtain an adhesive composition (S5-4). As the cross-linking agent, a multifunctional isocyanate compound (trade name "CORONATE L" produced by Nippon Polyurethane industry Co., Ltd.) is added to 100 weight parts of the acrylic-based polymer solution A (100 weight parts of the acrylic-based polymer A) in an amount of 0.3 weight parts to prepare an adhesive composition in a solution form. The adhesive composition obtained in this manner is coatingly applied to a release liner (S5-5). FIG. 14(a) is a schematic diagram illustrating a coating station for this step. In this station, a release liner 60 is prepared in the form of a roll 60a, and fed to a drying machine 62 via a guide roll 61. In the course of reaching the guide roll 61, the adhesive solution prepared in the above step is applied from a coating unit 63 to the release liner 60 unrolled from the roll 60a, to form a layer thereon.

In this example, a 38 μm-thick polyethylene terephthalate (PET) film having a surface subjected to a release treatment is used as the release liner 60. The adhesive solution is applied to the release-treated surface of the release liner 60 to allow the adhesive layer to have a dried thickness of 25 μm. The release liner 60 applied with the adhesive solution is fed to pass through a drying machine 62 to vaporize the solvent of the adhesive solution. The release liner 60 existing from the drying machine 62 is fed to pass through a pair of nip rolls 64a, 64b. A second release liner 65 unrolled from a second roll 66 is concurrently fed to the nip rolls 64a, 64b in such a manner as to be superimposed with respect to the adhesive layer formed on the first release liner 60, and pressed against and bonded to the adhesive layer by the nip rolls 64a, 64b. The second release liner 65 is formed by the same film as that of the first release liner 60, and a surface thereof to be bonded to the adhesive layer is subjected to a release treatment so as to allow a peel force of the second release liner 65 with respect to the adhesive layer to become smaller than that of the first release liner 60.

A laminate exiting from the first nip rolls 64a, 64b is formed in a structure in which the first and second release liners 60, 65 are laminated, respectively, on opposite sides of the adhesive layer 67 as illustrated in FIG. 14(b), and wound as a roll 68. In FIG. 13, a step of the drying is indicated as S5-6, and a step of the lamination of the second release liner 65 is indicated as S5-7. The produced adhesive laminate 69 is shipped (S5-9) via product inspection (S5-8).

(Formation of Polarizer Film)

FIGS. 15(a) and 15(b) illustrate a production station for a polarizer film. A film 71 as a raw material is made of a polymer material consisting primarily of a polyvinyl alcohol (PVA)-based resin, and prepared in the form of a roll 72. The PVA film 71 unrolled from the roll 72 is immersed in water in a water tank 73 to swell with water. Then, the water-swelled PVA film 71 is fed to pass through a dyeing tank 74 having an iodine-containing dyeing solution, so that, in the tank 74, it is impregnated with iodine. Then, the PVA film 71 impregnated with iodine is fed to pass through first and second cross-linking tanks 75, 76. In the cross-linking tanks 75, 76, a cross-linking bath containing potassium iodide and boric acid is formed, and a cross-linking treatment is promoted therein. During the course of the cross-linking treatment, the PVA film 71 is subjected to stretching. This stretching is performed by setting respective drive speeds of inlet-side and outlet-side rolls for feeding the PVA film 71 in such a manner that the drive speed of the outlet-side roll becomes greater than that of the inlet-side roll. The PVA film 71 subjected to the stretching is washed with water in a water washing tank 77, and then two protective films 78a, 78a are laminated, respective, to opposite surfaces of the stretched PVA film 71 to form a laminate 79 as illustrated in FIG. 15(b).

(Formation of Retardation Film)

A retardation film can be prepared by controlling a stretch ratio and a stretch temperature of a resin film. The stretch ratio may be appropriately determined depending on a desired retardation value, a film thickness required for optical compensation of a retardation film, a type of resin to be used, a thickness of a film to be used, a stretch temperature, etc. Production of such a retardation film is well known. A ¼λ retardation film usable in the present invention is prepared using the well-known technique to produce a retardation corresponding to a ¼λ phase.

(Formation of Polarization Functional Laminate)

Figure 15:
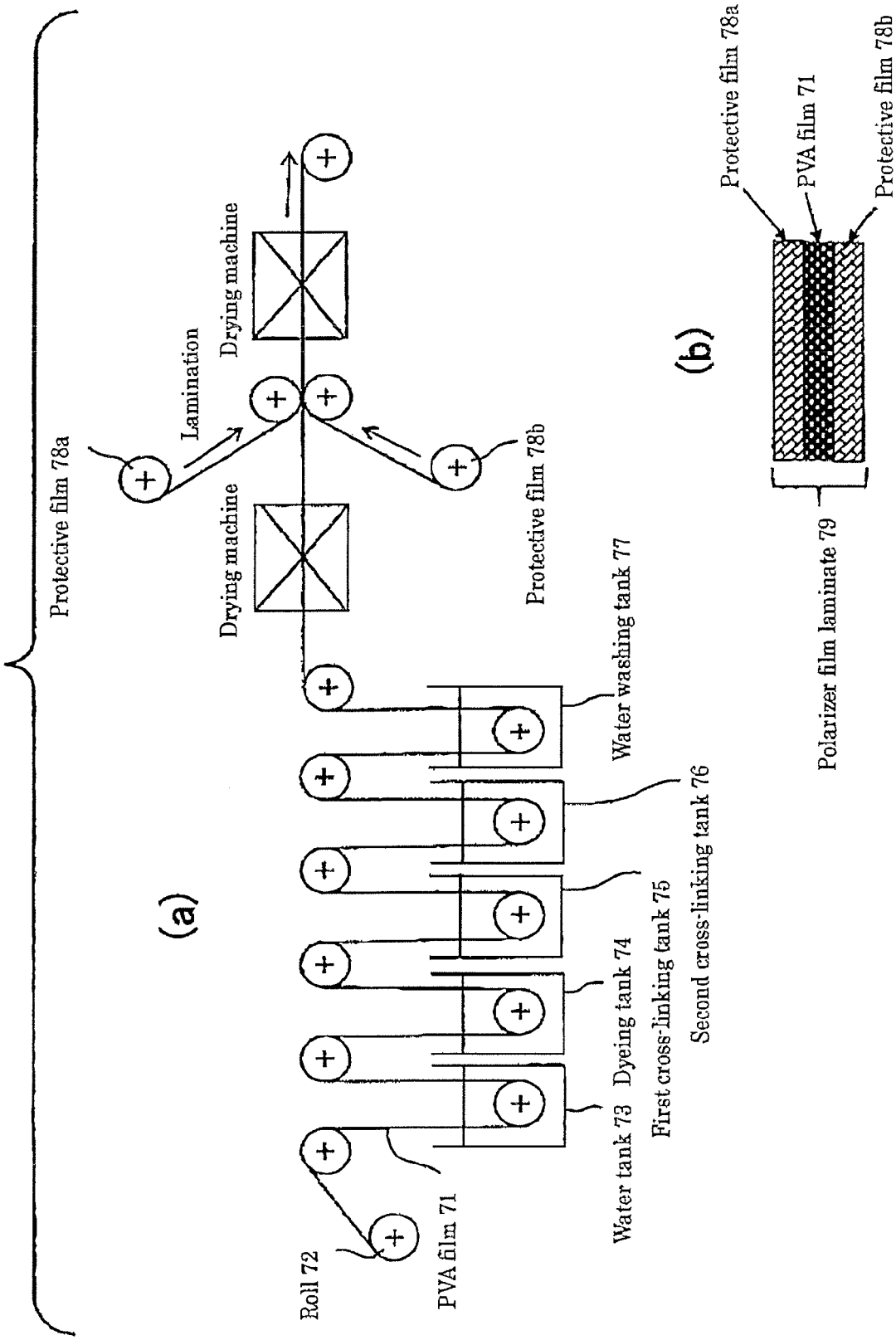
Figure 16:
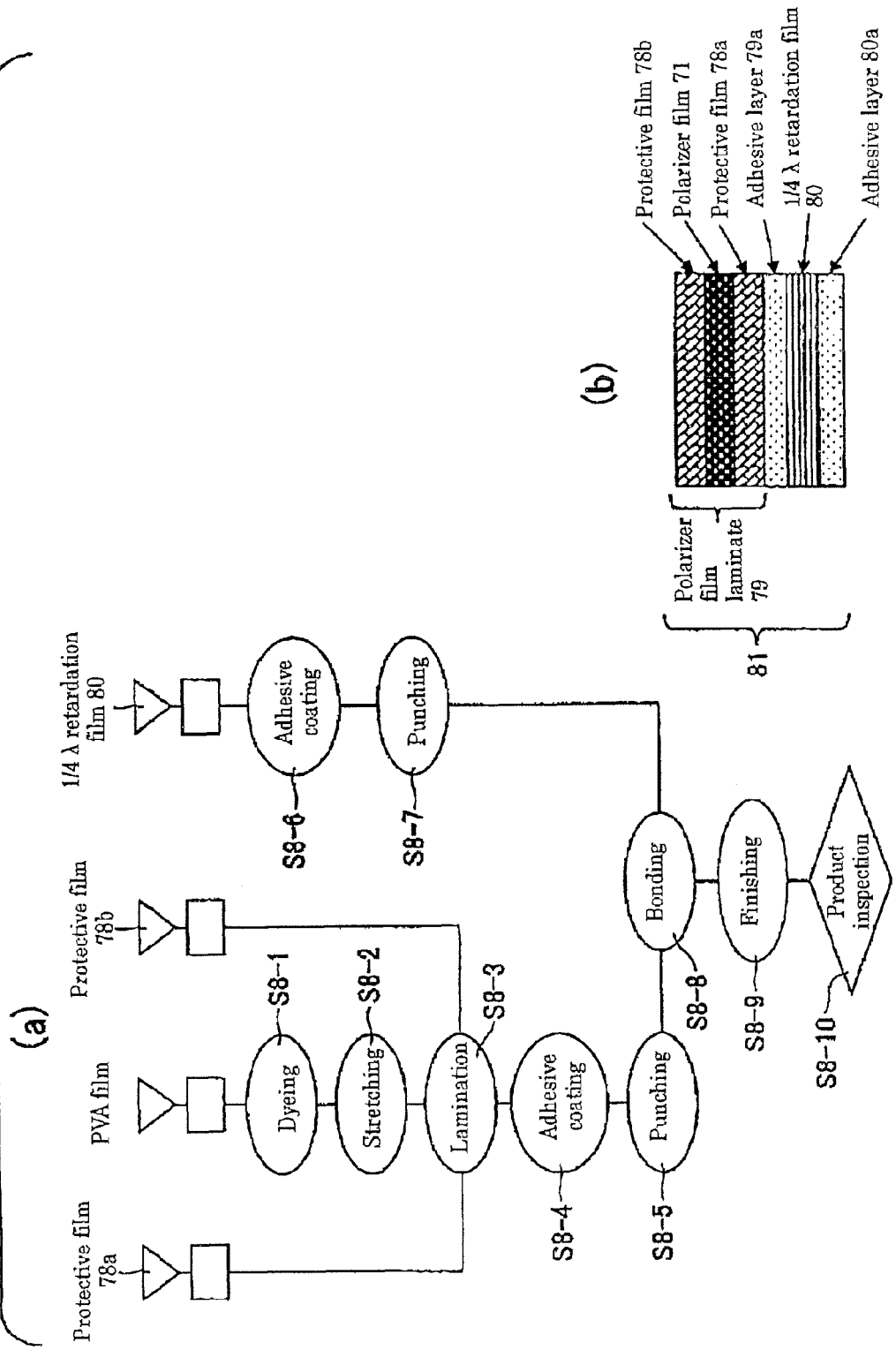

A polarization functional laminate usable in the present invention is obtained by laminating the ¼λ retardation film formed in the above manner to the polarizer laminate 79 illustrated in FIG. 15(b). FIG. 16(a) illustrates a process of laminating the polarizer laminate 79 and the ¼λ retardation film together. Firstly, a PVA film as a substrate for a polarizer film is formed as the polarizer film 71 illustrated in FIG. 15 via a dyeing step (S8-1) of performing dyeing by iodine and a stretching step (S8-2), and fed to a lamination step (S8-3) of laminating the protective films 78a, 78b thereto. In the lamination step (S8-3), the protective films 78a, 78b are laminated, respectively, to opposite surfaces of the polarizer film 71. Then, an adhesive is coatingly applied to one surface of the polarizer film 71 (S8-4). According to need, the polarizer film 71 coated with the adhesive is cut into a size corresponding to a size of a display panel device intended to use the polarizer film, for example, by punching (S8-5). In cases where the display panel device is an elongate type prepared in a roll form and used in a station for continuous lamination to display panel boards, this cutting step is omitted.

After subjecting the ¼λ retardation film to adhesive coating (S8-6), it is cut into a size corresponding to that of the display panel device (S8-7). In cases where the display panel device is an elongate type prepared in a roll form and used in a station for continuous lamination to display panel boards, this cutting step is omitted, as in the polarizer film laminate 79. The retardation film cut according to need is laminated to the polarizer film laminate 79 in such a manner that a surface thereof subjected to no adhesive coating is bonded to the laminate 79 through an adhesive layer on the laminate 79 (S8-8). The obtained product is subjected to necessary finishing, such as shaping of edges (S8-9), and transferred to a next station via production inspection (S8-10). FIG. 16(b) illustrates an obtained polarization functional laminate 81, wherein the polarizer film laminate 79 is bonded to the ¼λ retardation film 80 through the adhesive layer 79a. An adhesive layer 80a exists on an outer surface of the ¼λ retardation film 80. According to need, a release liner (not illustrated) is laminated to the adhesive layer 80a on the outer surface of the ¼λ retardation film 80. In this polarization functional laminate 81, the polarizer film laminate 79 and the ¼λ retardation film 80 are combined in this order when viewed from the viewing side. Thus, the polarization functional laminate 81 has a circularly polarizing function.

(Formation of Touch Panel Laminate)

A basic element layer of the touch panel laminate 3 is composed of a transparent substrate layer, an undercoat layer, an adhesive layer and a transparent electrically conductive layer. A material for forming the substrate layer is not particularly limited, but various types of plastic films having transparency may be employed. For example, the material for the substrate layer includes a polyester-based resin, a acetate-based resin, a polyether sulfone-based resin, a polycarbonate-based resin, a polyamide-based resin, a polyimide-based resin, a polyolefin-based resin, a (meth)acrylic-based resin, a polyvinyl chloride-based resin, a polyvinylidene chloride-based resin, a polystyrene-based resin, a polyvinyl alcohol-based resin, a polyarylate-based resin, and a polyphenylene sulfide-based resin. Among them, a particularly preferable material includes a polyester-based resin, a polycarbonate-based resin, and a polyolefin-based resin. As for the material for the substrate layer, there is a detailed description in the Patent Document 5. While any material described therein may be used, a polyethylene terephthalate (PET) film is commonly used. As a commercially available PET film, there are films produced by Mitsubishi Polyester, Inc. Specifically, two types of films having the same width (1085 mm) and different thicknesses (23 μm and 50 μm) are available. A PET film provided with an oligomer blocking layer for blocking oligomer generated by heat received during a lamination process is available. In a configuration where the touch panel laminate is arranged inside with respect to the polarization functional laminate when viewed from the viewing side, it is preferable that the substrate layer is made of a polycarbonate or norbornene-based resin, instead of PET.

Figure 17:
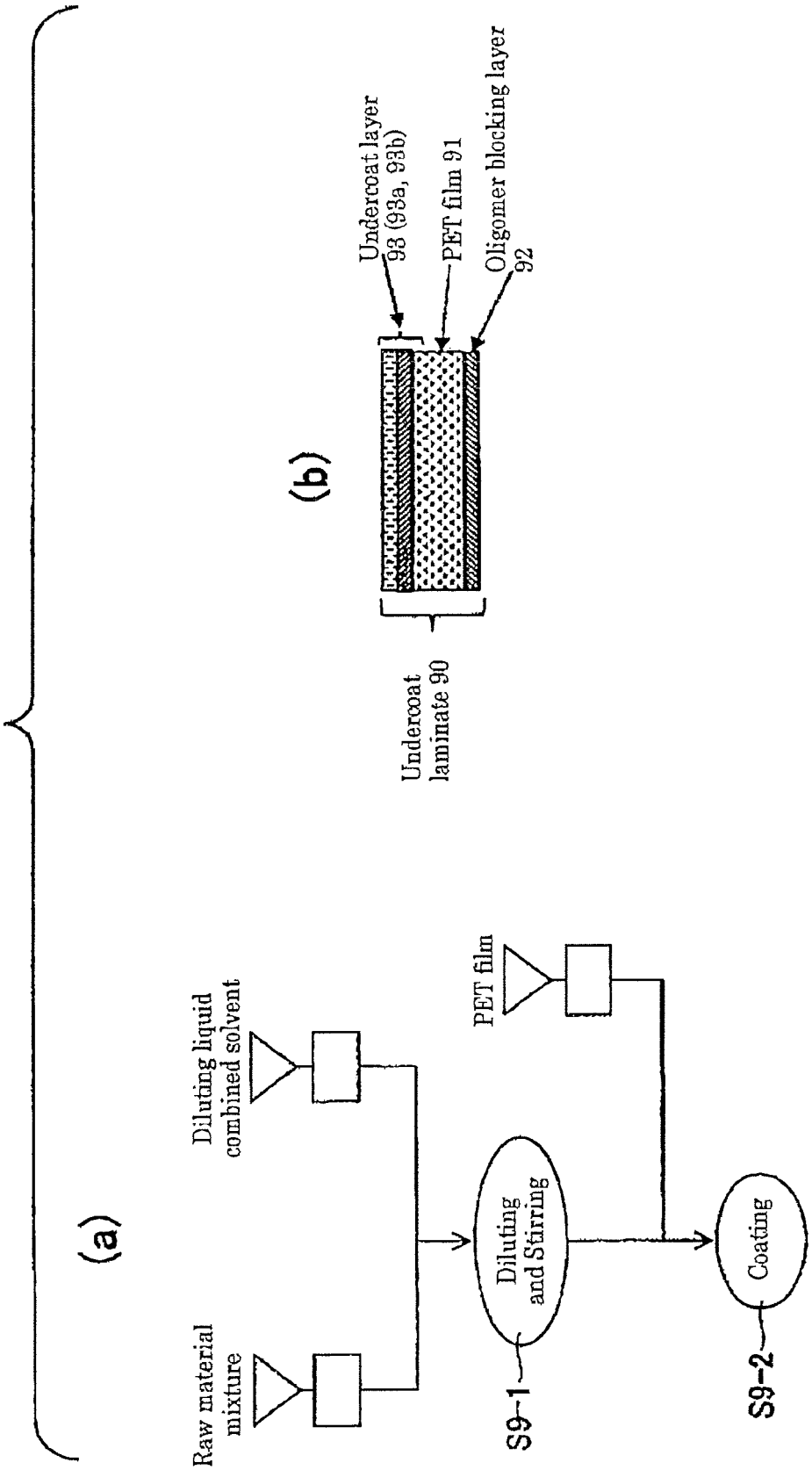

The undercoat layer may be formed by any method described in the Patent Document 5. FIG. 17(a) illustrates an undercoat layer coating process. For example, as a material for the undercoat layer, it is possible to use a mixture obtained by mixing a melamine resin, an alkyd resin and an organic silane condensate at a weight ratio of 2:2:1. This mixture contains a solid content at a weight ratio of 30%, and is available from Momentive Performance Materials, Inc., as the trade name "SHC 900". This undercoat raw material mixture is diluted by adding a diluting liquid combined solvent thereto, and the diluted mixture is stirred (S9-1). For example, this solvent may be prepared by mixing cyclopentanone, toluene and methyl ethyl ketone at a weight ratio of 4:3:3. A mixing rate of the solvent is determined to allow a solid content of the undercoat raw material mixture to be set to 1.5 weight %. The diluted undercoat raw material mixture is applied to a surface of the PET film on a side opposite to an oligomer blocking layer preliminarily formed on the other surface thereof (S9-2). Through this process, as illustrated in FIG. 17(b), an undercoat laminate 90 is formed which comprises an oligomer blocking layer 92 formed on one surface of a PET film 91, and an undercoat layer 93 formed on the other surface of the PET film 91. According to need, a second undercoat layer may be formed on the undercoat layer 93. In FIG. 17(b), the reference codes 93a, 93b noted in brackets indicate an undercoat formed in a two-layer structure.

Figure 18:
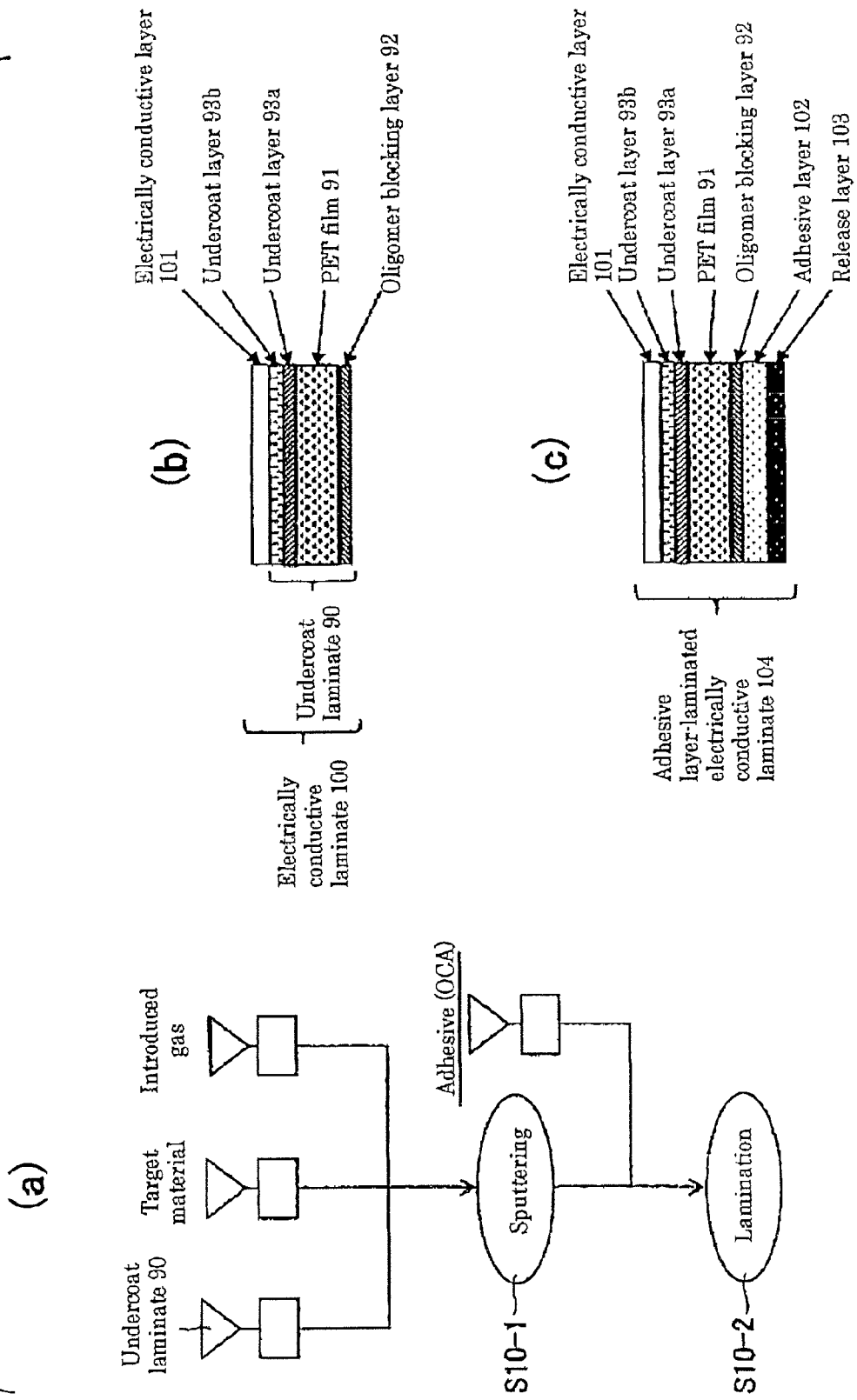

Then, a sputtering process is performed to form the electrically conductive layer on the undercoat laminate 90 obtained in the above manner. FIG. 18(a) is a block diagram illustrating one example of the sputtering process. A sputtering target material consisting of 90 weight % of indium oxide and 10 weight % of tin oxide is sputtered against a surface of an outer undercoat layer 93b of the undercoat laminate 90 formed by the process in FIG. 17(a), in a vacuum atmosphere under a condition that an introduced gas consisting of 98 volume % of argon and 2 volume % of oxygen is excited into a plasma state (S10-1). In this way, an electrically conductive laminate 100 illustrated in FIG. 18(b) is obtained in which an electrically conductive layer 101 is formed on the undercoat layer 93b. A release liner is laminated to the electrically conductive laminate 100 through an adhesive layer (S10-2). FIG. 18(c) illustrates an adhesive layer-laminated electrically conductive laminate 104 obtained in this process. As illustrated in FIG. 18(c), the adhesive layer-laminated electrically conductive laminate 104 has a laminate structure in which the first undercoat layer 93a and the second undercoat layer 93b are formed on one surface of the substrate layer 91 in this order, wherein the electrically conductive layer 101 is formed on the second undercoat layer 93b, and a release liner 103 is bonded to the other surface of the substrate layer 91 on a side opposite to the first undercoat layer 93 through an adhesive layer 102.

Figure 14:
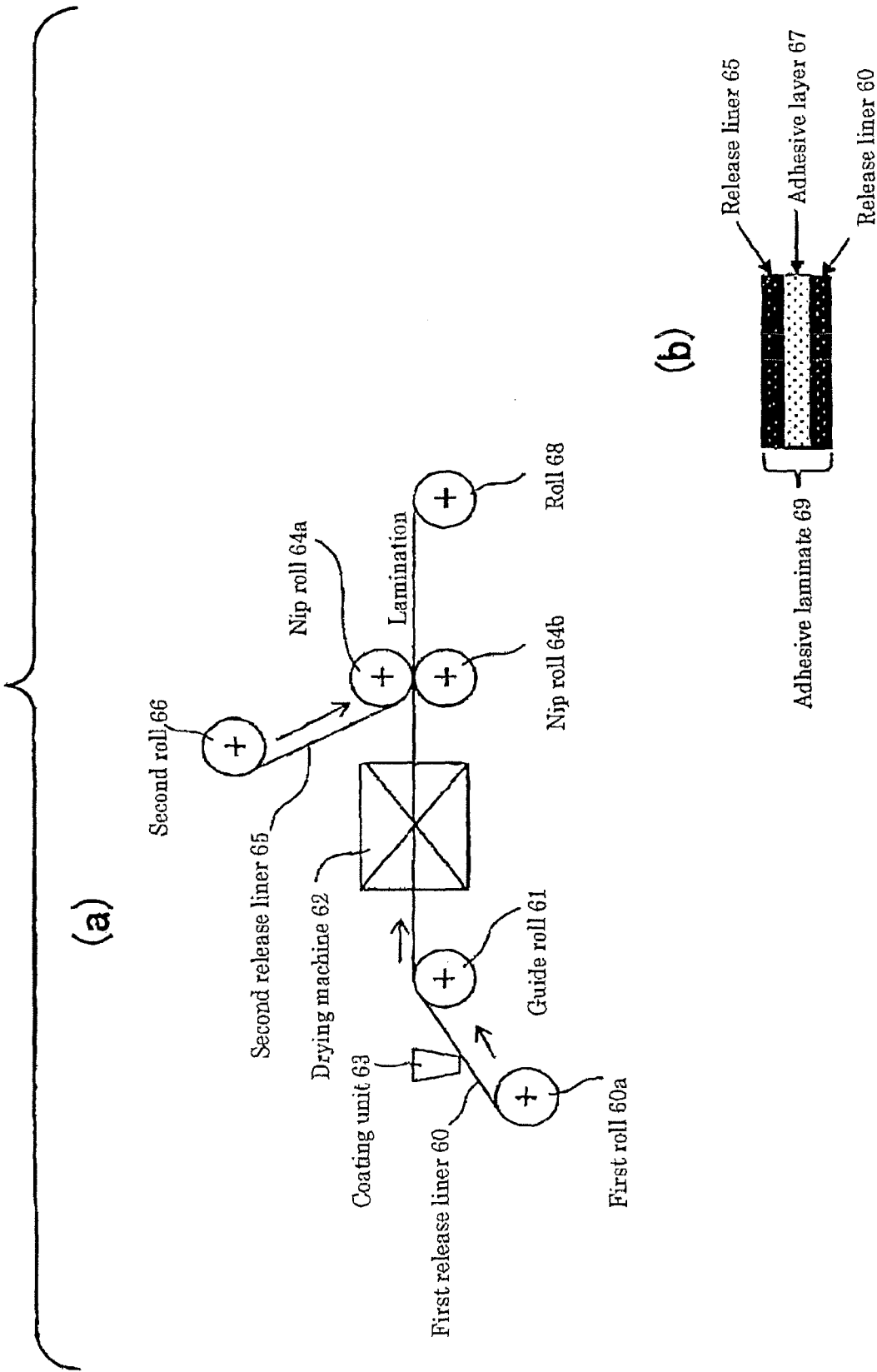
Figure 19:
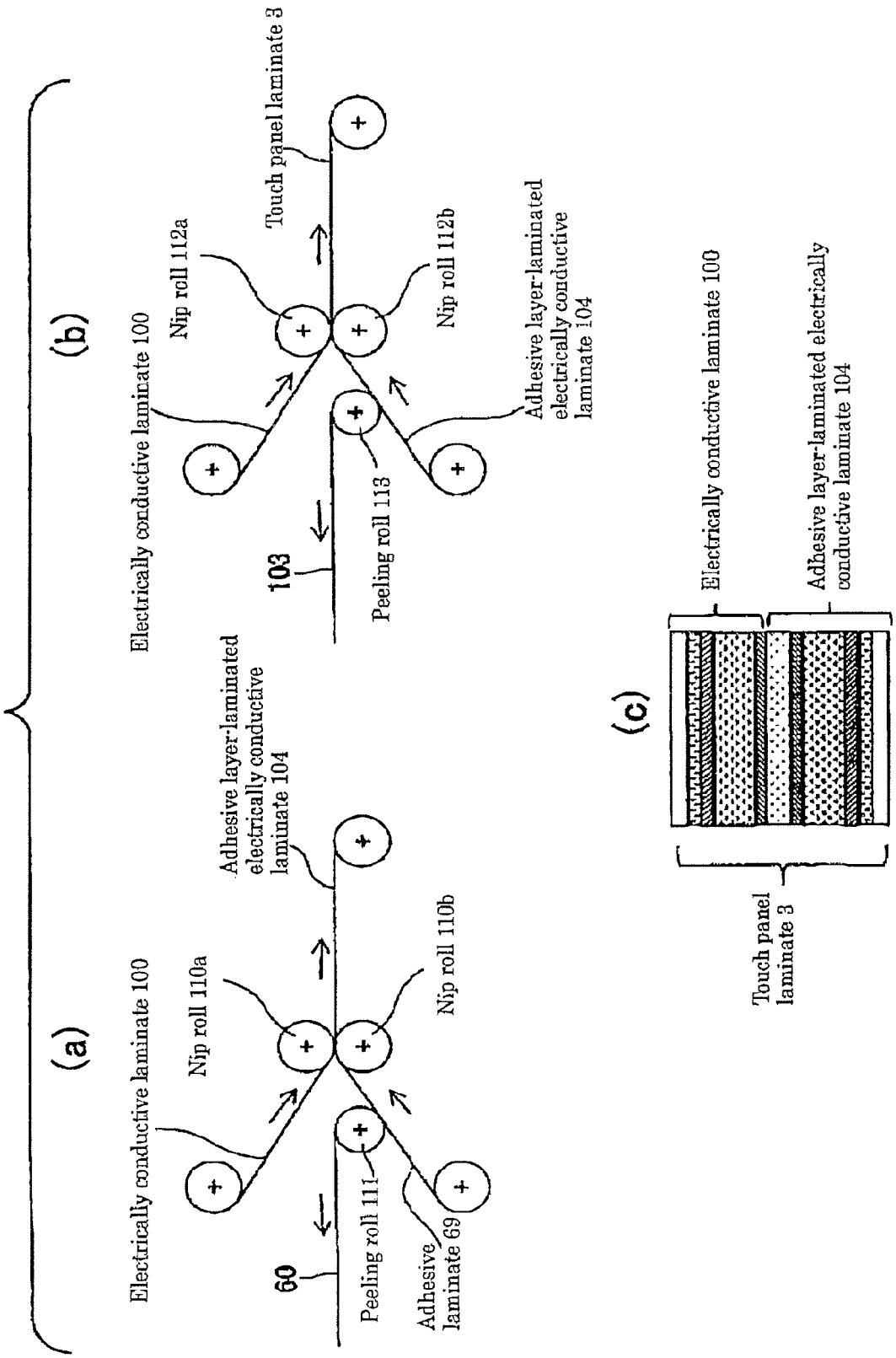
FIGS. 19(a), 19(b) and 19(c) are, respectively, a schematic diagram of a process for forming the electrically conductive layer, a schematic diagram illustrating a station for laminating the adhesive layer-laminated electrically conductive laminate to the electrically conductive laminate, and a sectional view of a touch panel laminate to be obtained.

FIG. 19(a) is a schematic diagram illustrating a station for laminating the adhesive layer 102 in FIG. 18(c). In FIG. 19(a), the electrically conductive laminate 100 and the adhesive laminate 69 formed by the station illustrated in FIG. 14 are unrolled, respectively, from their rolls, and fed to pass through between a pair of nip rolls 110a, 110b. The electrically conductive laminate 100 is fed from the roll to allow the oligomer blocking layer 92 to face the adhesive laminate 69. The adhesive laminate 69 is also prepared in the form of a roll, and fed to pass through between the nip rolls 110a, 110b, while peeling the release liner 60 provided on one side by a peeling roll 111 and allowing the exposed adhesive layer 67 to face the electrically conductive laminate 100. In this way, the adhesive layer-laminated electrically conductive laminate 104 illustrated in FIG. 17(c) is obtained. This adhesive layer-laminated electrically conductive laminate 104 is wound in a roll form as illustrated in FIG. 18(a). The electrically conductive laminate 100 illustrated in FIG. 17(b) is laminated to the adhesive layer-laminated laminate 104 to form a touch panel laminate 3. FIG. 19(b) is a schematic diagram illustrating a station for the lamination. In FIG. 19(b), the electrically conductive laminate 100 is prepared in the form of a roll. The electrically conductive laminate 100 is unrolled, and fed to pass through a pair of nip rolls 112a, 112b, in a posture where the oligomer blocking layer 92 on the substrate layer 91 is located on a lowermost side. The adhesive layer-laminated electrically conductive laminate 104 is unrolled in a posture where the release liner 103 is located on an uppermost side, and fed to pass through the nip rolls 112a, 112b, while peeling the release liner 103 by a peeling roll 113 and allowing the exposed adhesive layer 102 to face the electrically conductive laminate 100. The laminates 100, 104 are pressed against each other and bonded together by the nip rolls 112a, 112b to form a touch panel laminate. The electrically conductive layers 101 on opposite surfaces of the touch panel laminate are heated and crystallized, for example, by feeding it to pass through a drying oven, and then patterned into a desired pattern by a well-known etching process. The pattering process is well known, as described in detail, for example, in the Patent Document 6, and its detailed description will be omitted here. Through patterning of the electrically conductive layers, the touch panel laminate 3 usable in the display panel devices illustrated in FIGS. 1 to 4 can be obtained. A cross-section of the touch panel laminate is illustrated in FIG. 19(c).

(Verification of Pattern Visibility Suppressing Effect of Undercoat Layer)

[Testing Method]

<Refractive Index>

A refractive index of each layer was measured while allowing measurement light (sodium D-lines) to enter into each measurement surface, using an Abbe refractometer produced by Atago Co., Ltd., by a specified measurement method designated by the refractometer.

<Thickness of Each Layer>

As for a layer having a thickness of 1 μm or more, such as a film substrate, a transparent substrate, a hard coat layer and an adhesive layer, a thickness measurement was performed using a microgauge type thickness meter produced by Mitutoyo Corporation. As for a layer having difficulty in directly measuring a thickness, such as a hard coat layer and an adhesive layer, a thickness of the layer was obtained by measuring a total thickness of a substrate provided with each layer and subtracting a thickness of the substrate from the total thickness.

A thickness of each layer, such as a first dielectric layer, a second dielectric layer or an ITO film, was calculated based on an interference spectrum waveform using Instantaneous Multichannel Photodetector system "MCPD-2000" (product name) produced by Otsuka Electronics Co., Ltd.

<Reflective Properties>

A reflectance in each of a pattern area and an area just below a pattern opening in an wavelength range of 380 nm to 780 nm was measured at internals of 5 nm under a condition that an incident angle with respect to the ITO film is set to 2 degree, using an integrating sphere measurement mode in a spectrophotometer "U-4100" (trade name) produced by Hitachi High Technologies Corporation. Then, an average reflectance in each of the pattern area and the area just below the pattern opening was calculated, and a difference ΔR between respective average reflectances in the pattern area and the area just below the pattern opening was calculated. The above measurement was performed in a state in which a light blocking layer is formed on a back surface of a transparent electrically conductive film (sample) (on the side of a PET film) by using a black color spray to almost eliminate reflection from the back surface of the sample and light incidence from the side of the back surface of the sample.

Further, using a D65 light source, color coordinates (L*, a* and b*) of reflected light in each of the pattern area and the area just below the pattern opening were calculated, and a color difference ΔE between reflected light in the pattern area and reflected light in the area just below the pattern opening, by using the following formula:

$$\Delta E = \{(\Delta L^*)^2 + (\Delta a^*)^2 + (\Delta b^*)^2\}^{0.5}$$

EXAMPLES

Inventive Example 1

(Formation of Undercoat Layer)

A thermosetting resin composition containing a melamine resin, an alkyd resin and an organic silane condensate at a weight ratio of 2:2:1 was applied to one surface of a transparent film substrate (refractive index $n_1 = 1.65$) composed of a 25 μm-thick polyethylene terephthalate film (hereinafter referred to as "PET film"), and then dried and hardened to form a first undercoat layer composed of a 20 nm-thick dielectric layer. In Inventive Example 1, the first undercoat layer had a refractive index $n_{21}$ of 1.54.

Then, a second dielectric layer composed of a 10 nm-thick dielectric layer was formed by: diluting silica sol (Colcoat P produced by Colcoat Co., Ltd.) with ethanol to allow a concentration of solid content to become 2 weight %; applying the diluted silica sol to the first undercoat layer by a silica coating method; and drying and hardening the silica sol. The second dielectric layer had a refractive index $n_{22}$ of 1.46.

(Formation of ITO Film)

A 23 nm-thick ITO film (refractive index $n_3 = 2.00$) was formed on the second undercoat layer by a reactive sputtering method using a sintered body comprising 97 weight % of indium oxide and 3 weight % of tin oxide, in an atmosphere containing 98% of argon gas and 2% of oxygen gas and having a pressure of 0.4 Pa, to obtain a transparent electrically conductive film.

(Patterning of ITO Film)

A photoresist patterned in stripes was applied to a transparent electrically conductive layer of the transparent electrically conductive film, and then dried and hardened. Then, the ITO film was etched by immersing it in a 5 weight % hydrochloric acid solution (aqueous hydrogen chloride solution) at 25° C. for 1 minute. After completion of the etching, the photoresist was removed.

(Crystallization of ITO Film)

The etched ITO film was crystallized through a heating treatment at 140° C. for 90 minutes.

Inventive Example 2

A first undercoat layer composed of a dielectric layer, a second undercoat layer composed of a dielectric layer, and an ITO film were formed on one surface of a PET film to obtain a transparent electrically conductive film, in the same manner as that in Inventive Example 1.

(Patterning of ITO Film)

A photoresist patterned in stripes was applied to the transparent conductive film of the transparent electrically conductive film, and then dried and hardened. Then, the ITO film was etched by immersing it in a 5 weight % hydrochloric acid solution at 25° C. for 1 minute.

(Patterning of Second Undercoat Layer)

After etching the ITO film, the second undercoat layer composed of a dielectric film was subsequently etched by immersing it in a 2 weight % sodium hydroxide aqueous solution at 45° C. for 3 minutes, while leaving the laminated photoresist. After completion of the etching, the photoresist was removed.

(Crystallization of ITO Film)

After patterning the ITO film and the second undercoat layer, the ITO film was crystallized through a heating treatment at 140° C. for 90 minutes.

Inventive Examples 3 and 4

In Inventive Examples 3 and 4, two types of transparent electrically conductive films each having a pattern area and a pattern opening were prepared in the same manner as those in Inventive Examples 1 and 2. However, Inventive Examples 3 and 4 were different from Inventive Examples 1 and 2, in that the thickness of the first undercoat layer composed of a dielectric layer was set to 35 nm, and the thickness of the second undercoat layer composed of a dielectric layer was set to 5 nm.

Inventive Examples 5 and 6

In Inventive Examples 5 and 6, two types of transparent electrically conductive films each having patterned areas and patterned openings were prepared in the same manner as those in Inventive Examples 1 and 2. However, Inventive Examples 5 and 6 were different from Inventive Examples 1 and 2, in that the thickness of the first undercoat layer composed of a dielectric layer was set to 30 nm, and the thickness of the second undercoat layer composed of a dielectric layer was set to 15 nm.

Comparative Example 1

In Comparative Example 1, a transparent electrically conductive film having a pattern area and a pattern opening was prepared in the same manner as that in Inventive Example 1. However, Comparative Example 1 was different from Inventive Example 1, in that the thickness of the first undercoat layer composed of a dielectric layer was set to 45 nm, and the thickness of the second undercoat layer composed of a dielectric layer was set to 10 nm.

Comparative Example 2

In Comparative Example 2, a transparent electrically conductive film having a pattern area and a pattern opening was prepared in the same manner as that in Inventive Example 1. However, Comparative Example 2 was different from Inventive Example 1, in that the thickness of the first undercoat layer composed of a dielectric layer was set to 30 nm, and the thickness of the second undercoat layer composed of a dielectric layer was set to 30 nm.

Comparative Example 3

In Comparative Example 3, a transparent electrically conductive film having a pattern area and a pattern opening was prepared in the same manner as that in Inventive Example 1. However, Comparative Example 3 was different from Inventive Example 1, in that the thickness of the first undercoat layer composed of a dielectric layer was set to 40 nm, and the thickness of the second undercoat layer composed of a dielectric layer was set to 30 nm.

Comparative Example 4

In Comparative Example 4, a transparent electrically conductive film having a pattern area and a pattern opening was prepared in the same manner as that in Inventive Example 1. However, Comparative Example 4 was different from Inventive Example 1, in that the first undercoat layer composed of a dielectric layer was formed in the following manner, and the thickness of the second undercoat layer composed of a dielectric layer was set to 35 nm.

(Formation of First Undercoat Layer)

A 20 nm-thick silicon tin oxide film was formed, as the first undercoat layer composed of a dielectric layer, on one surface of a 25 μm-thick PET film substrate (refractive index $n_1$=1.65) by a sputtering method. The first undercoat layer composed of a dielectric layer had a refractive index of 1.70.

Evaluation results of the transparent electrically conductive films of the Inventive Examples and Comparative Examples are illustrated in the following Table 1.

TABLE 1

| | First Undercoat Layer | | Second Undercoat Layer | | | Reflective Properties | |
|---|---|---|---|---|---|---|---|
| | $n_{21}$ | $d_{21}$ (nm) | $n_{22}$ | $d_{22}$ (nm) | Patterning | ΔE | ΔR (%) |
| Inventive Example 1 | 1.54 | 20 | 1.46 | 10 | NO | 3.2 | 0.26 |
| Inventive Example 2 | 1.54 | 20 | 1.46 | 10 | YES | 2.4 | 0.19 |
| Inventive Example 3 | 1.54 | 35 | 1.46 | 5 | NO | 5.4 | 0.65 |
| Inventive Example 4 | 1.54 | 35 | 1.46 | 5 | YES | 5.2 | 0.46 |
| Inventive Example 5 | 1.54 | 30 | 1.46 | 15 | NO | 6.5 | 0.56 |
| Inventive Example 6 | 1.54 | 30 | 1.46 | 15 | YES | 5.4 | 0.47 |
| Comparative Example 1 | 1.54 | 45 | 1.46 | 10 | NO | 8.9 | 1.23 |
| Comparative Example 2 | 1.54 | 30 | 1.46 | 30 | NO | 11.3 | 1.19 |
| Comparative Example 3 | 1.54 | 40 | 1.46 | 30 | NO | 12.7 | 1.94 |
| Comparative Example 4 | 1.70 | 20 | 1.46 | 35 | NO | 6.8 | 1.08 |

Table 1 shows that the reflectance difference and the color difference between the pattern area and the pattern opening in the transparent electrically conductive film of the present invention are small even when the transparent electrically conductive layer is patterned, and therefore the pattern is less likely to become visible. In particular, when the second dielectric layer is patterned in the same manner as that for the transparent conductive layer as mentioned in Inventive Examples 2, 4, and 6, the pattern is far less likely to become visible and therefore good appearance can be ensured.

As above, although the present invention has been particularly shown and described with reference to specific embodiments thereof, it is to be understood that the scope of the present invention is not limited to details of the illustrated embodiments, but should be determined by the appended claims and their legal equivalents.

EXPLANATION OF CODES

1: device
3: touch panel laminate
5: display panel
7: window
13: edge print
15: circular polarization functional laminate 15*a*: polarizing film layer
15*b*: adhesive layer
15*c*: λ/4 retardation film
31: first transparent electrically conductive layer
32: second transparent electrically conductive layer
33, 36: conductive layer-side undercoat layer
34, 37: substrate layer-side undercoat layer
35: first transparent substrate layer
38: second transparent substrate layer
39: adhesive layer
51: polarizer film
52: ¼λ retardation film

What is claimed is:

1. A display panel device having a capacitive touch input function, comprising a window, a capacitive touch panel laminate and a display panel, the display panel device being characterized in that the touch panel laminate comprises: an optically transparent first substrate layer; a pattern-shaped first transparent electrically conductive layer laminated to one surface of the first substrate layer; and a pattern-shaped second transparent electrically conductive layer disposed to face the first transparent electrically conductive layer across at least the first substrate layer, the first transparent electrically conductive layer being disposed on a side closer to the window with respect to the first substrate layer, wherein:

at least two undercoat layers are disposed between the first transparent electrically conductive layer and the first substrate, and including a near-side undercoat layer located at a side closer to the first transparent electrically conductive layer which has a refractive index less than that of a far-side undercoat layer located at a side farther from the first transparent electrically conductive layer, the near-side undercoat layer having a thickness less than that of the far-side undercoat layer; and a space between the window and one of the layers closest to the window is filled with an optically transparent adhesive.

2. The display panel device as defined in claim 1, characterized in that the near-side undercoat layer is patterned in a same pattern as that of the first transparent electrically conductive layer.

3. The display panel device as defined in claim 1, wherein the layer closest to the window is the first transparent electrically conductive layer.

4. The display panel device as defined in claim 1, wherein the far-side undercoat layer has a thickness of 35 nm or less.

5. The display panel device as defined in claim 4, wherein the near-side undercoat layer has a thickness which is equal to or less than ½ of the thickness of the far-side undercoat layer.

6. The display panel device as defined in claim 1, further including a hard coat layer disposed between the first substrate layer and the far-side undercoat layer.

7. The display panel device as defined in claim 1, wherein the second transparent electrically conductive layer is formed on an optically transparent second substrate layer through an at least one-layer undercoat layer.

8. The display panel device as defined in claim 7, wherein the second substrate layer is located on a side opposite to the first transparent electrically conductive layer with respect to the second transparent electrically conductive layer.

9. The display panel device as defined in claim 7, wherein the second substrate layer is located on a same side as that of the first transparent electrically conductive layer with respect to the second transparent electrically conductive layer.

* * * * *